US012569970B2

(12) United States Patent
Maegawa et al.

(10) Patent No.: US 12,569,970 B2
(45) Date of Patent: Mar. 10, 2026

(54) POWER TOOL HAVING HAMMER MECHANISM

(71) Applicant: MAKITA CORPORATION, Anjo (JP)

(72) Inventors: Masahiro Maegawa, Anjo (JP); Kiyonobu Yoshikane, Anjo (JP); Kazuki Nakagawa, Anjo (JP); Yuzuru Nishio, Anjo (JP)

(73) Assignee: MAKITA CORPORATION, Anjo (JP)

(*) Notice: Subject to any disclaimer, the term of this patent is extended or adjusted under 35 U.S.C. 154(b) by 217 days.

(21) Appl. No.: 18/152,883

(22) Filed: Jan. 11, 2023

(65) Prior Publication Data

US 2023/0241752 A1 Aug. 3, 2023

(30) Foreign Application Priority Data

Feb. 2, 2022 (JP) ................................ 2022-014746
Feb. 2, 2022 (JP) ................................ 2022-014748

(51) Int. Cl.
*B25D 17/24* (2006.01)
*B25D 17/04* (2006.01)

(52) U.S. Cl.
CPC ............ *B25D 17/24* (2013.01); *B25D 17/04* (2013.01); *B25D 2250/041* (2013.01); *B25D 2250/095* (2013.01); *B25D 2250/121* (2013.01)

(58) Field of Classification Search
CPC .. B25D 17/04; B25D 17/24; B25D 2250/041; B25D 2250/095; B25D 2250/121
See application file for complete search history.

(56) References Cited

U.S. PATENT DOCUMENTS

| | | | |
|---|---|---|---|
| 3,559,751 | A | 2/1971 | Yamada |
| 3,835,935 | A | 9/1974 | Sides et al. |
| 3,995,703 | A | 12/1976 | Wanner |
| 4,042,036 | A | 8/1977 | Smith et al. |
| 4,060,138 | A | 11/1977 | Cox et al. |

(Continued)

FOREIGN PATENT DOCUMENTS

| | | | |
|---|---|---|---|
| CN | 206640466 | U | 11/2017 |
| CN | 110625574 | A | 12/2019 |

(Continued)

OTHER PUBLICATIONS

Apr. 23, 2025 Office Action issued in U.S. Appl. No. 17/841,944.

(Continued)

*Primary Examiner* — Anna K Kinsaul
*Assistant Examiner* — David G Shutty
(74) *Attorney, Agent, or Firm* — Oliff PLC

(57) ABSTRACT

A power tool having a hammer mechanism includes a first housing, a motor housed in the first housing, a second housing that at least partially covers the first housing, and a controller housed in the second housing. The second housing is coupled to the first housing via at least one elastic member to be movable relative to the first housing in a first direction that is parallel to the driving axis. The second housing has at least one opening for wiring. The at least one opening communicatively connects an inside and an outside of the second housing. At least one electric wire extends from the controller to the outside of the second housing through the at least one opening.

11 Claims, 15 Drawing Sheets

(56) References Cited

U.S. PATENT DOCUMENTS

| | | | | |
|---|---|---|---|---|
| 4,747,455 | A | 5/1988 | Cunningham | |
| 6,154,369 | A | 11/2000 | Martinez, Jr. et al. | |
| 6,732,815 | B2 | 5/2004 | Hanke et al. | |
| 6,913,088 | B2 | 7/2005 | Berger | |
| 6,962,211 | B2 | 11/2005 | Daubner et al. | |
| 6,996,909 | B1 | 2/2006 | Buck et al. | |
| 7,059,423 | B1 | 6/2006 | Hoggarth | |
| 7,401,661 | B2 | 7/2008 | Berghauser et al. | |
| 7,472,760 | B2 * | 1/2009 | Stirm | B25D 17/043 173/90 |
| 7,624,815 | B2 | 12/2009 | Friedrich et al. | |
| 7,637,328 | B2 * | 12/2009 | Sato | B25D 17/24 16/431 |
| 7,640,997 | B2 | 1/2010 | Bram et al. | |
| 7,882,900 | B2 | 2/2011 | Borinato et al. | |
| 8,235,136 | B2 | 8/2012 | Berger et al. | |
| 8,333,251 | B2 | 12/2012 | Cecchin et al. | |
| 8,342,260 | B2 | 1/2013 | Buchenau et al. | |
| 8,534,376 | B2 | 9/2013 | Braun et al. | |
| 8,616,301 | B2 | 12/2013 | John et al. | |
| 8,678,106 | B2 | 3/2014 | Matsunaga et al. | |
| 8,955,615 | B2 | 2/2015 | John et al. | |
| 8,991,675 | B2 | 3/2015 | Liang et al. | |
| 9,802,306 | B2 | 10/2017 | Miwa et al. | |
| 9,844,868 | B1 | 12/2017 | Abbey et al. | |
| 10,022,852 | B2 | 7/2018 | Ikuta et al. | |
| 10,618,157 | B2 * | 4/2020 | Hashimoto | B25D 16/00 |
| 10,814,468 | B2 | 10/2020 | Krug et al. | |
| 10,926,393 | B2 | 2/2021 | Zawisza et al. | |
| 11,274,400 | B2 * | 3/2022 | Widlroither | B25D 11/06 |
| 11,739,481 | B2 | 8/2023 | Borgers et al. | |
| 11,759,935 | B2 | 9/2023 | Zawisza et al. | |
| 11,787,017 | B2 * | 10/2023 | Widlroither | E01B 29/28 173/93 |
| 11,932,996 | B2 * | 3/2024 | Widlroither | B25F 5/006 |
| 11,992,926 | B2 | 5/2024 | Tauber et al. | |
| 2002/0053445 | A1 | 5/2002 | Kim et al. | |
| 2003/0155142 | A1 | 8/2003 | Kikuchi et al. | |
| 2006/0131042 | A1 | 6/2006 | Hammerstingl et al. | |
| 2007/0114051 | A1 * | 5/2007 | Ege | B25F 5/006 173/217 |
| 2008/0006420 | A1 | 1/2008 | Berghauser et al. | |
| 2008/0196913 | A1 | 8/2008 | Bram et al. | |
| 2009/0057006 | A1 | 3/2009 | Kishibata et al. | |
| 2009/0307875 | A1 | 12/2009 | Nakashima et al. | |
| 2010/0033885 | A1 * | 2/2010 | Hotchkiss | H05K 5/064 264/272.11 |
| 2013/0098647 | A1 | 4/2013 | Martinsson et al. | |
| 2015/0090470 | A1 | 4/2015 | Miwa et al. | |
| 2015/0151419 | A1 | 6/2015 | Bralla | |
| 2015/0266176 | A1 | 9/2015 | Takeuchi et al. | |
| 2015/0328760 | A1 | 11/2015 | Ikuta et al. | |
| 2016/0020443 | A1 | 1/2016 | White et al. | |
| 2016/0067856 | A1 | 3/2016 | Bito et al. | |
| 2017/0057064 | A1 | 3/2017 | Ishikawa et al. | |
| 2017/0101747 | A1 | 4/2017 | Borgers et al. | |
| 2017/0193761 | A1 | 7/2017 | Suzuki | |
| 2017/0312902 | A1 * | 11/2017 | Noguchi | B25D 17/24 |
| 2018/0193995 | A1 | 7/2018 | Runau | |
| 2018/0345469 | A1 * | 12/2018 | Tanabe | B25D 17/043 |
| 2018/0352671 | A1 * | 12/2018 | Takasaki | H05K 7/12 |
| 2019/0006980 | A1 | 1/2019 | Sheeks et al. | |
| 2019/0195019 | A1 * | 6/2019 | Wang | E21B 7/028 |
| 2019/0381646 | A1 | 12/2019 | Yoshikane et al. | |
| 2020/0130161 | A1 | 4/2020 | Zawisza et al. | |
| 2020/0306946 | A1 | 10/2020 | Takeuchi | |
| 2020/0391369 | A1 | 12/2020 | Furusawa et al. | |
| 2021/0162526 | A1 | 6/2021 | Aoki | |
| 2021/0230810 | A1 | 7/2021 | Widlroither | |
| 2021/0268636 | A1 | 9/2021 | Braun et al. | |
| 2021/0339372 | A1 | 11/2021 | Geiger et al. | |
| 2022/0247280 | A1 | 8/2022 | Purohit et al. | |
| 2022/0271624 | A1 | 8/2022 | Wang et al. | |
| 2022/0295657 | A1 * | 9/2022 | Zapata | H02K 7/145 |
| 2023/0026934 | A1 | 1/2023 | Yoshikane et al. | |
| 2023/0027574 | A1 | 1/2023 | Yoshikane et al. | |
| 2023/0063991 | A1 * | 3/2023 | Bader | B25F 5/02 |
| 2023/0241752 | A1 * | 8/2023 | Maegawa | B25D 17/043 173/162.1 |
| 2024/0109171 | A1 * | 4/2024 | Ringler | H03K 17/97 |
| 2024/0116160 | A1 | 4/2024 | Ringler et al. | |
| 2024/0316743 | A1 * | 9/2024 | Ringler | H03K 17/97 |

FOREIGN PATENT DOCUMENTS

| | | | | |
|---|---|---|---|---|
| DE | 202012012149 | U1 * | 4/2013 | B25D 17/24 |
| DE | 102018210189 | A1 * | 12/2019 | B25D 11/00 |
| EP | 1980371 | A1 | 10/2008 | |
| EP | 3184259 | A1 | 6/2017 | |
| JP | 2008073836 | A | 4/2008 | |
| JP | 2015-066628 | A | 4/2015 | |
| JP | 2015066629 | A | 4/2015 | |
| JP | 2015-100898 | A | 6/2015 | |
| JP | 2016-087703 | A | 5/2016 | |
| JP | 2016-165783 | A | 9/2016 | |
| JP | 2016-165784 | A | 9/2016 | |
| JP | 2017-056537 | A | 3/2017 | |
| JP | 2017-113863 | A | 6/2017 | |
| JP | 2018-094634 | A | 6/2018 | |
| JP | 2020-157423 | A | 10/2020 | |
| JP | 2020-199608 | A | 12/2020 | |
| JP | 2022-017127 | A | 1/2022 | |
| WO | 2013139425 | A1 | 9/2013 | |
| WO | 2020/031888 | A1 | 2/2020 | |

OTHER PUBLICATIONS

U.S. Appl. No. 17/842,014, filed Jun. 16, 2022 in the name of Yoshikane et al.
U.S. Appl. No. 17/841,944, filed Jun. 16, 2022 in the name of Yoshikane et al.
Mar. 27, 2024 Office Action Issued in U.S. Appl. No. 17/842,014.
Jul. 18, 2024 Office Action issued in U.S. Appl. No. 17/841,944.
Aug. 28, 2024 U.S. Office Action issued in U.S. Appl. No. 17/842,014.
Dec. 31, 2024 Office Action issued in U.S. Appl. No. 17/842,014.
Nov. 19, 2024 Office Action issued in Japanese Patent Application No. 2021-121981.
Dec. 10, 2024 Office Action issued in Japanese Patent Application No. 2021-121982.
Nov. 19, 2024 Office Action issued in Japanese Patent Application No. 2021-121976.
Jan. 7, 2025 Office Action issued in Japanese Patent Application No. JP 2021-121979.
Feb. 4, 2025 Office Action issued in Japanese Patent Application No. 2021-121976.
Jun. 30, 2025 Office Action issued in U.S. Appl. No. 17/842,014.
Jun. 24, 2025 Office Action issued in Japanese Patent Application No. 2022-014746.
Jun. 24, 2025 Office Action issued in Japanese Patent Application No. 2022-014748.
Sep. 30, 2025 Office Action issued in Japanese Patent Application No. 2022-014746.
Sep. 10, 2025 Office Action issued in U.S. Appl. No. 17/841,944.
Jan. 15, 2026 Office Action issued in U.S. Appl. No. 17/841,944.
Dec. 29, 2025 Office Action issued in U.S. Appl. No. 17/842,014.

* cited by examiner

POWER TOOL HAVING HAMMER MECHANISM

CROSS-REFERENCE TO RELATED APPLICATION

The present application claims priority to Japanese patent application Nos. 2022-014746 and 2022-014748, both of which were filed on Feb. 2, 2022. The contents of the foregoing applications are hereby fully incorporated herein by reference.

TECHNICAL FIELD

The present disclosure relates to a power tool having a hammer mechanism that is configured to linearly drive a tool accessory.

BACKGROUND

A power tool having a hammer mechanism intermittently hammers (strikes) an axial end of a tool accessory to thereby linearly drive the tool accessory along a driving axis to perform a processing operation (for example, a chipping operation) on a workpiece. In such a power tool, especially large vibration is generated in an extension direction of the driving axis in response to driving of the motor. Accordingly, various known power tools include a vibration-isolating structure for reducing transmission of the vibration to a grip part. For example, Japanese laid-open patent publication No. 2016-165783 discloses a power tool having a hammer mechanism. This power tool includes a driving-part housing and a head-part housing. The driving-part housing houses a driving part. The head-part housing is elastically supported by the driving part housing and has a handle integrated thereto.

SUMMARY

The above-described power tool is capable of effectively reducing the transmission of the vibration from the driving-part housing to the handle. On the other hand, since the power tool having such a vibration-isolating mechanism includes at least two components that move relative to each other, careful consideration is required for an arrangement of electric wires in the housings.

Accordingly, it is a non-limiting object of the present disclosure to provide improvement in wiring in a power tool having a hammer mechanism that includes a vibration-isolating structure.

One non-limiting embodiment according to the present disclosure provides a power tool having a hammer mechanism that is configured to linearly drive a tool accessory along a driving axis by striking (hammering) the tool accessory. The power tool includes a first housing, a motor, a second housing, and a controller.

The first housing defines the driving axis of the tool accessory. The motor is housed in the first housing. The second housing at least partially covers the first housing. The second housing is coupled to the first housing via at least one elastic member to be movable relative to the first housing in a first direction that is parallel to the driving axis. The controller is housed in the second housing. The controller is configured to control driving of the motor. The second housing has at least one opening for wiring. The at least one opening communicatively connects an inside and an outside of the second housing. In other words, the inside and the outside of the second housing are connected via the at least one opening. At least one electric wire extends from the controller to the outside of the second housing through the at least one opening.

In the power tool according to this embodiment, when vibration in the first direction is caused on the first housing in response to driving of the motor, the second housing moves relative to the first housing in the first direction, which is parallel to the driving axis, while receiving a biasing force of the at least one elastic member. Owing to such a vibration-isolating housing structure of the power tool, vibration to be transmitted to the second housing can be reduced. Thus, the controller, which is disposed in the second housing, can be effectively protected from the vibration. In addition, the at least one electric wire extends from the controller to the outside of the second housing through the at least one opening. Thus, a possibility of a physical contact between the at least one electric wire and the first housing due to the vibration of the first housing can be effectively reduced. Therefore, deterioration of the at least one electric wire can be suppressed. Further, an assembler of the power tool (a worker who assembles the power tool) can physically connect the at least one electric wire from the controller to another electric wire, a component, or at least one connecting component (e.g., a connector, a coupler, a terminal, etc.) that is separate (discrete, independent) from the electric wire, outside the housing. Accordingly, efficiency of wiring can be enhanced.

7 is a perspective view of a controller case in which a controller assembly is accommodated.

Figure 8:
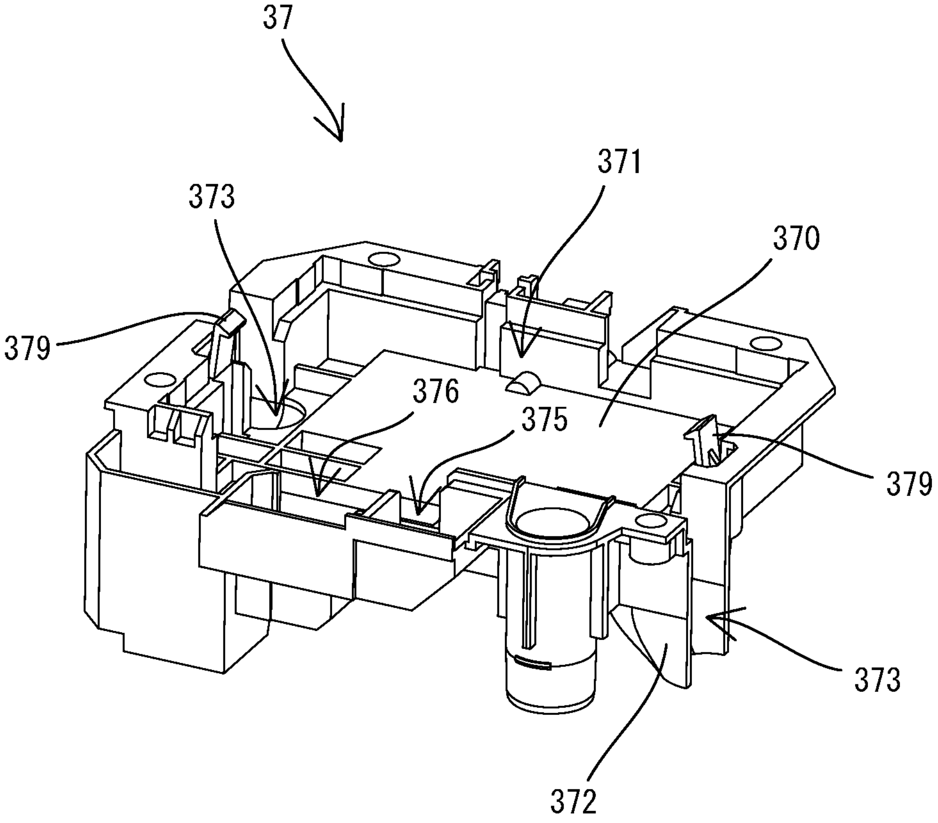

FIG. 8 is a perspective view of the controller case.

Figure 9:
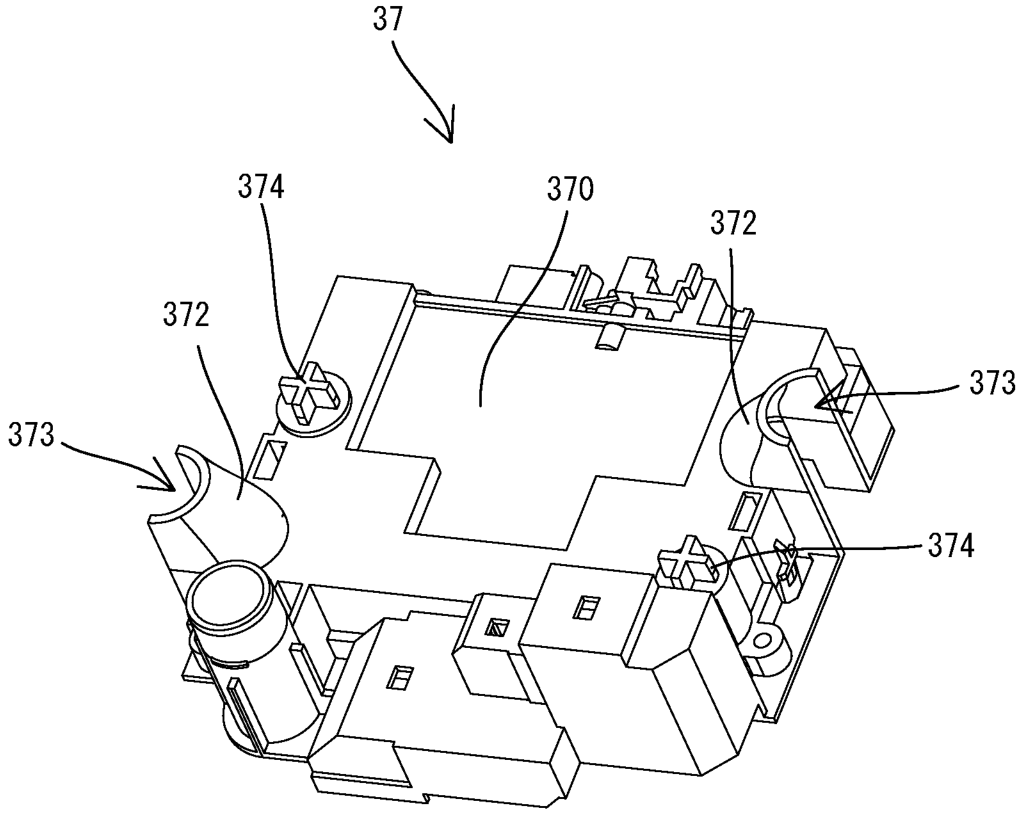

FIG. 9 is another perspective view of the controller case.

Figure 10:
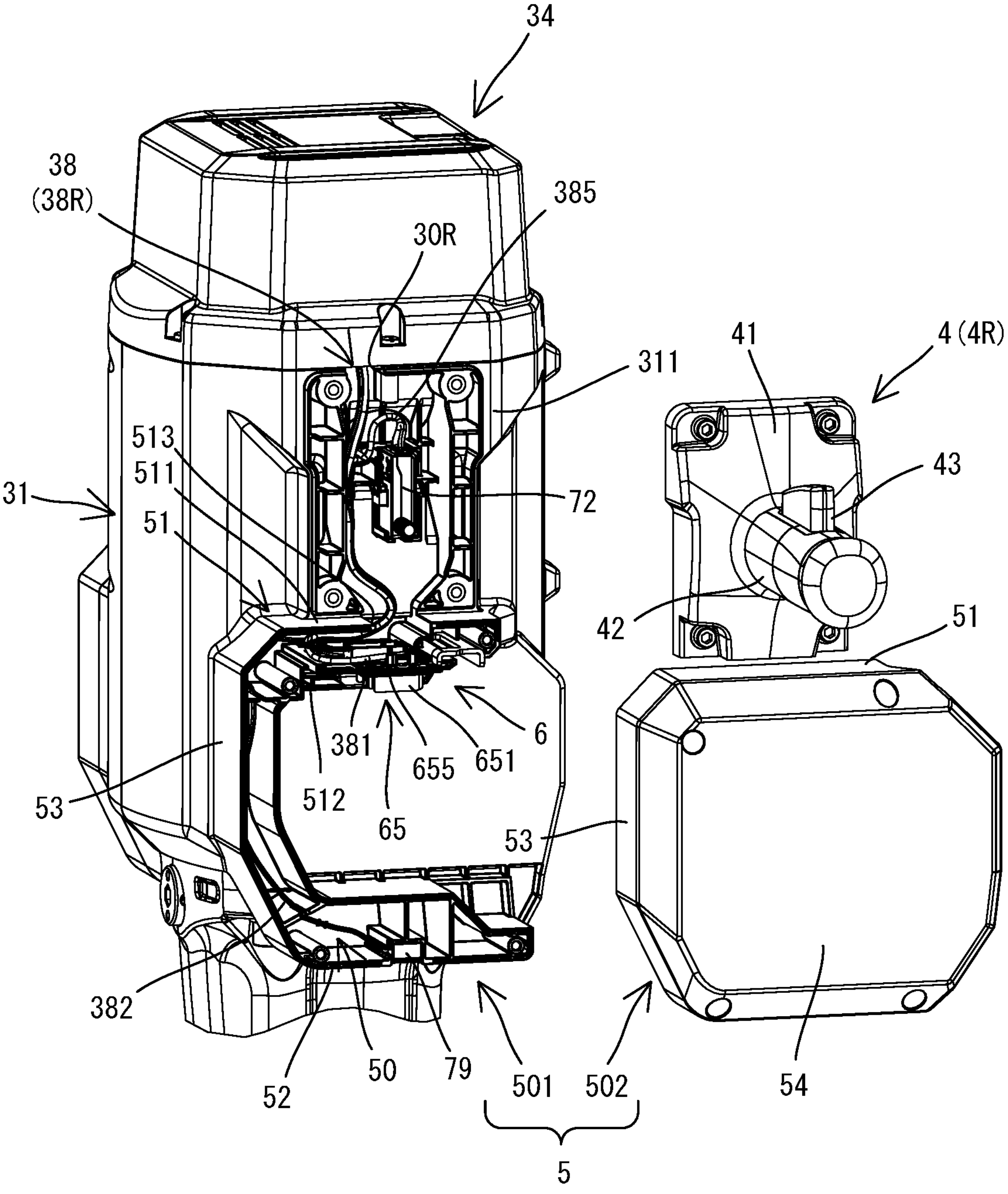

FIG. 10 is a perspective view of the hammer, from which a right handle and a cover part of a right battery housing are separated.

Figure 11:
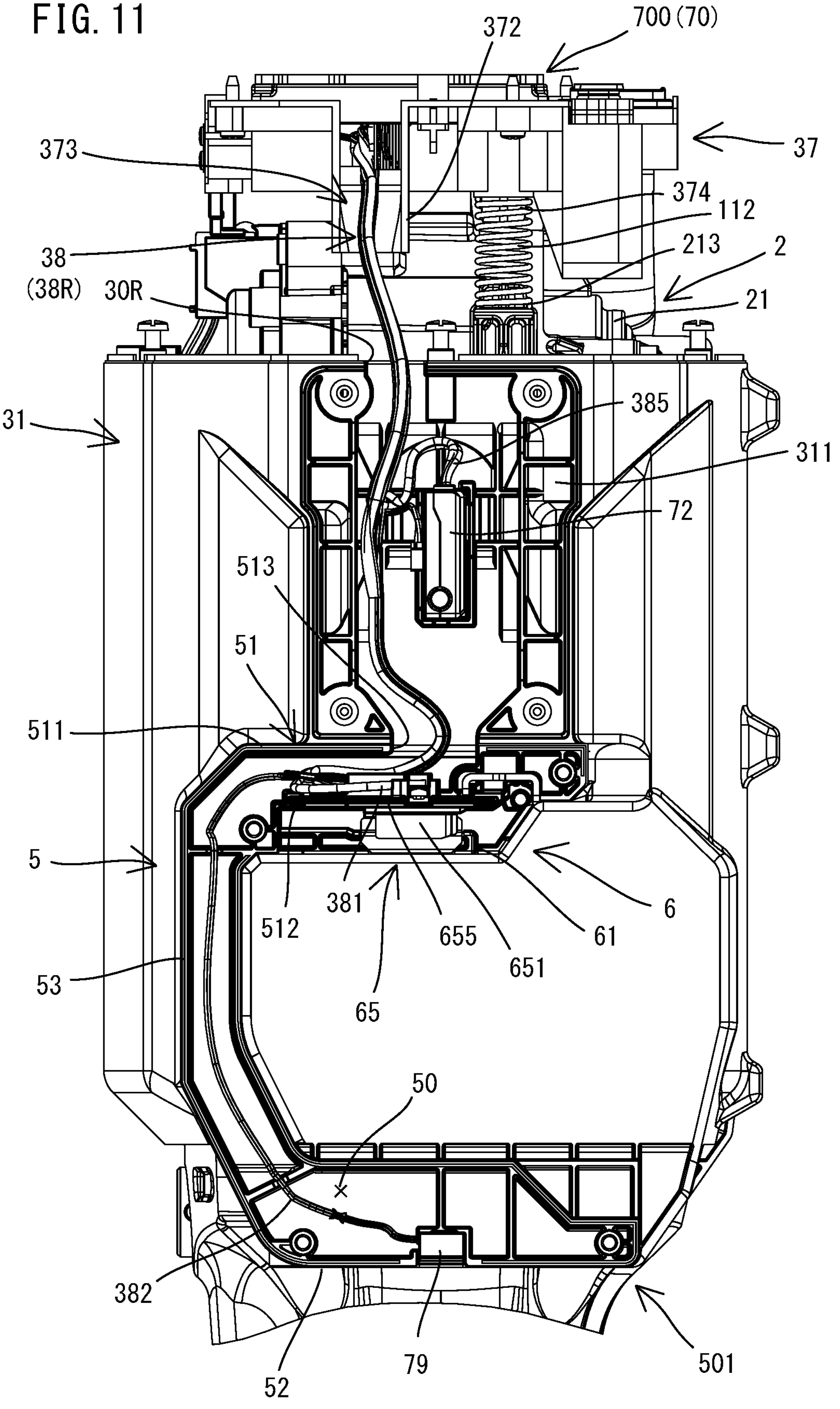

FIG. 11 is a right view of the hammer without the top cover, the right handle and the cover part of the right battery housing.

Figure 4:
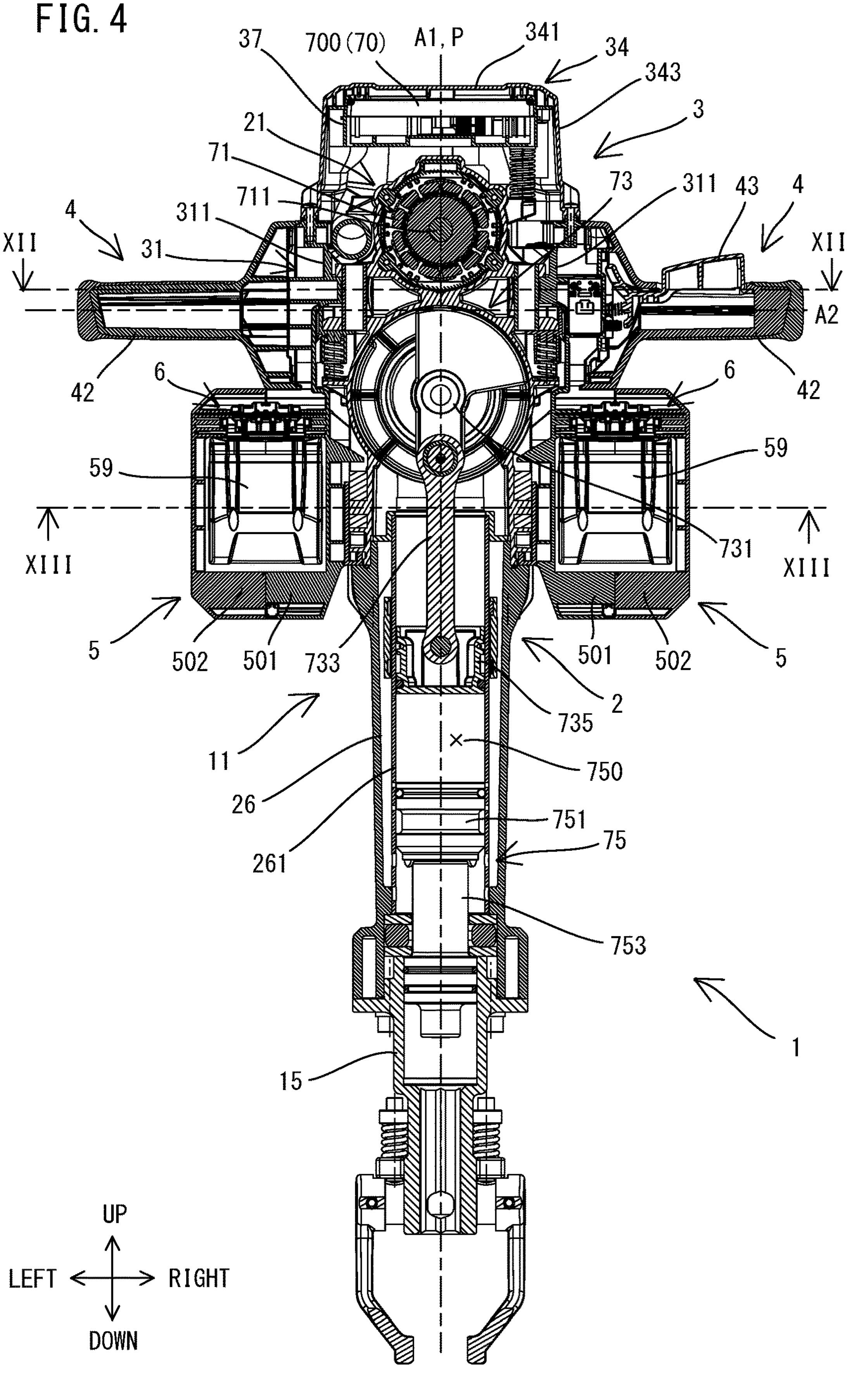
FIG. 4 is a sectional view taken along line IV-IV in FIG. 3.
Figure 12:
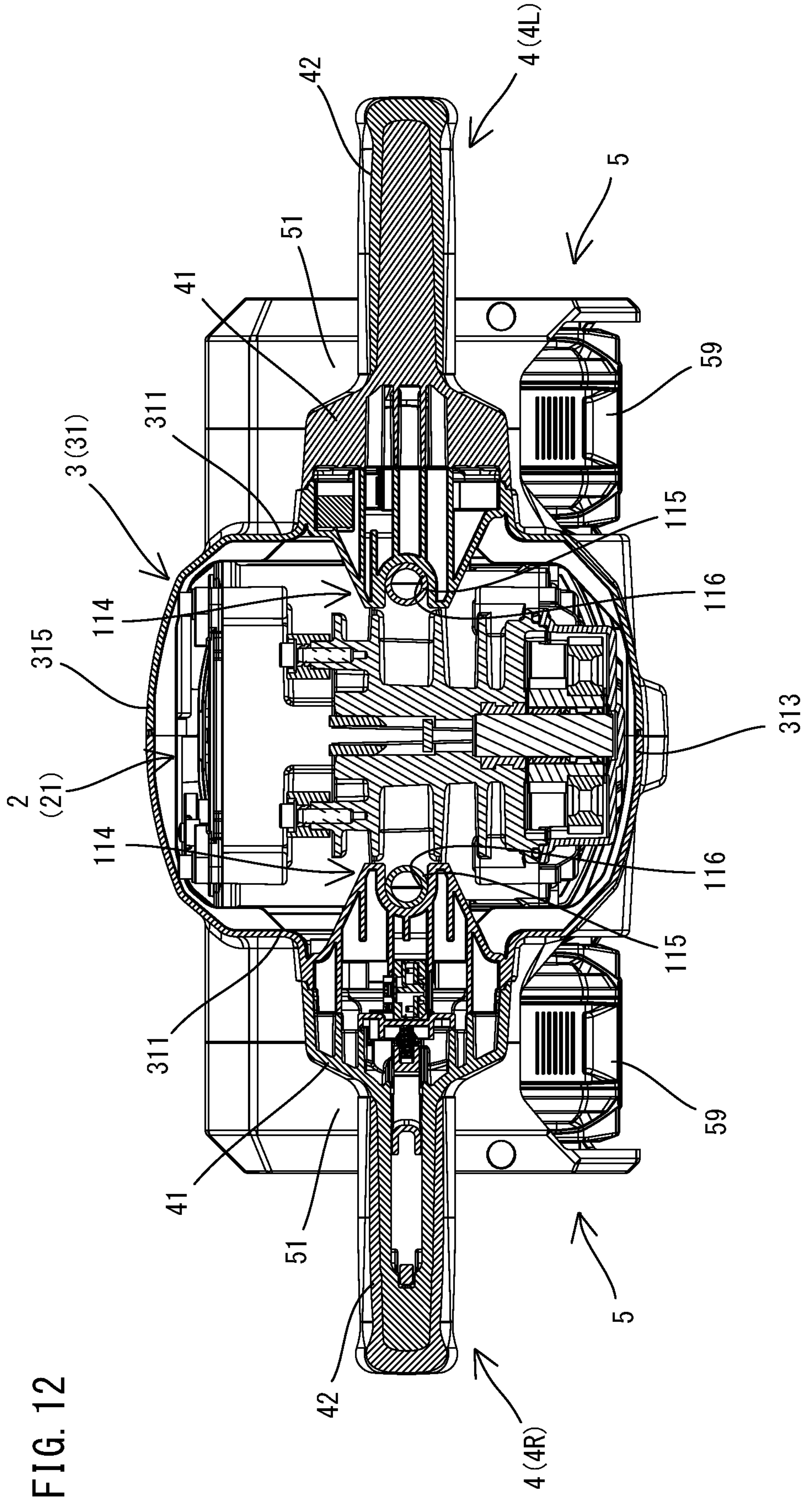

FIG. 12 is a sectional view taken along line XII-XII in FIG. 4.

Figure 13:
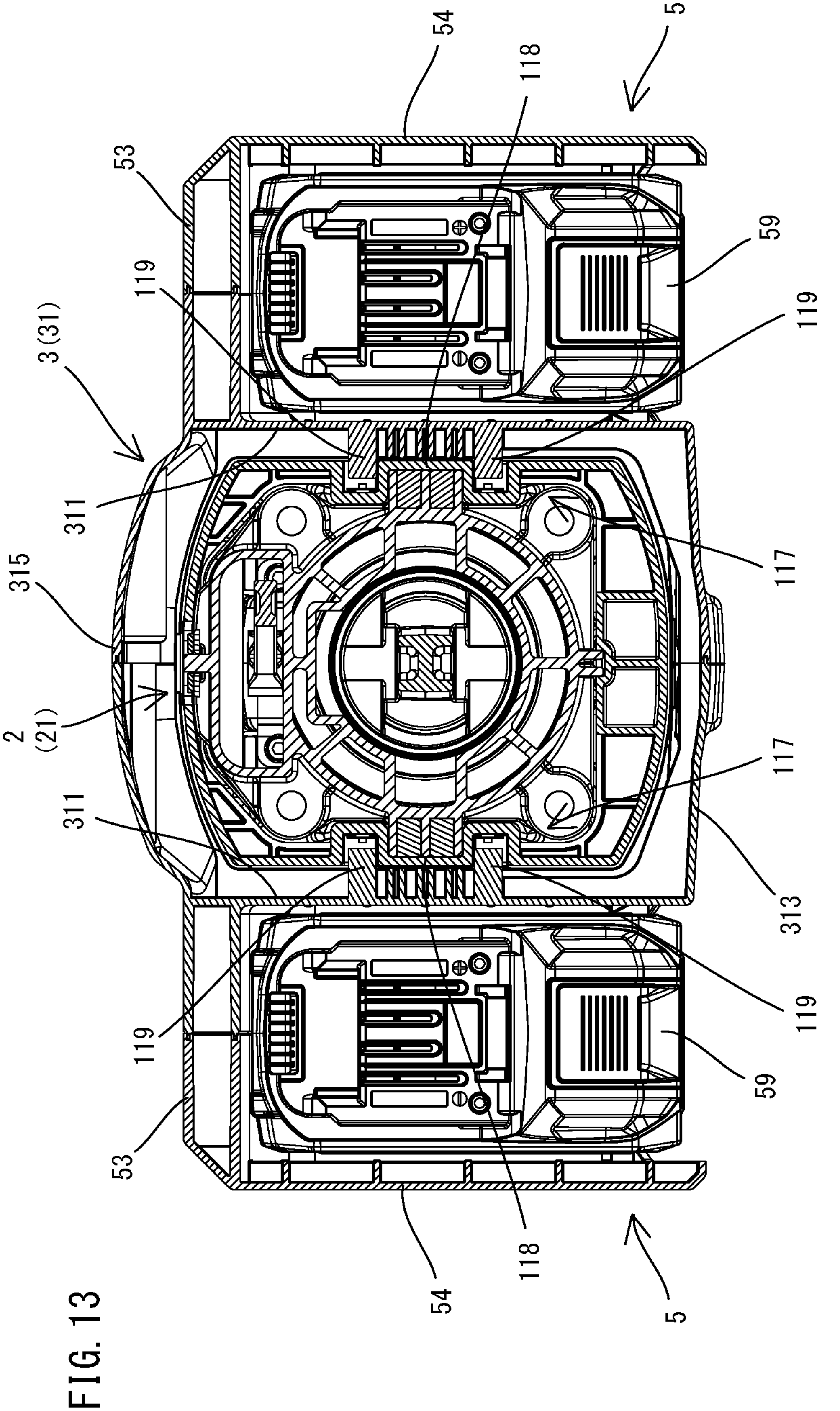

FIG. 13 is a sectional view taken along line XIII-XIII in FIG. 4.

Figure 14:
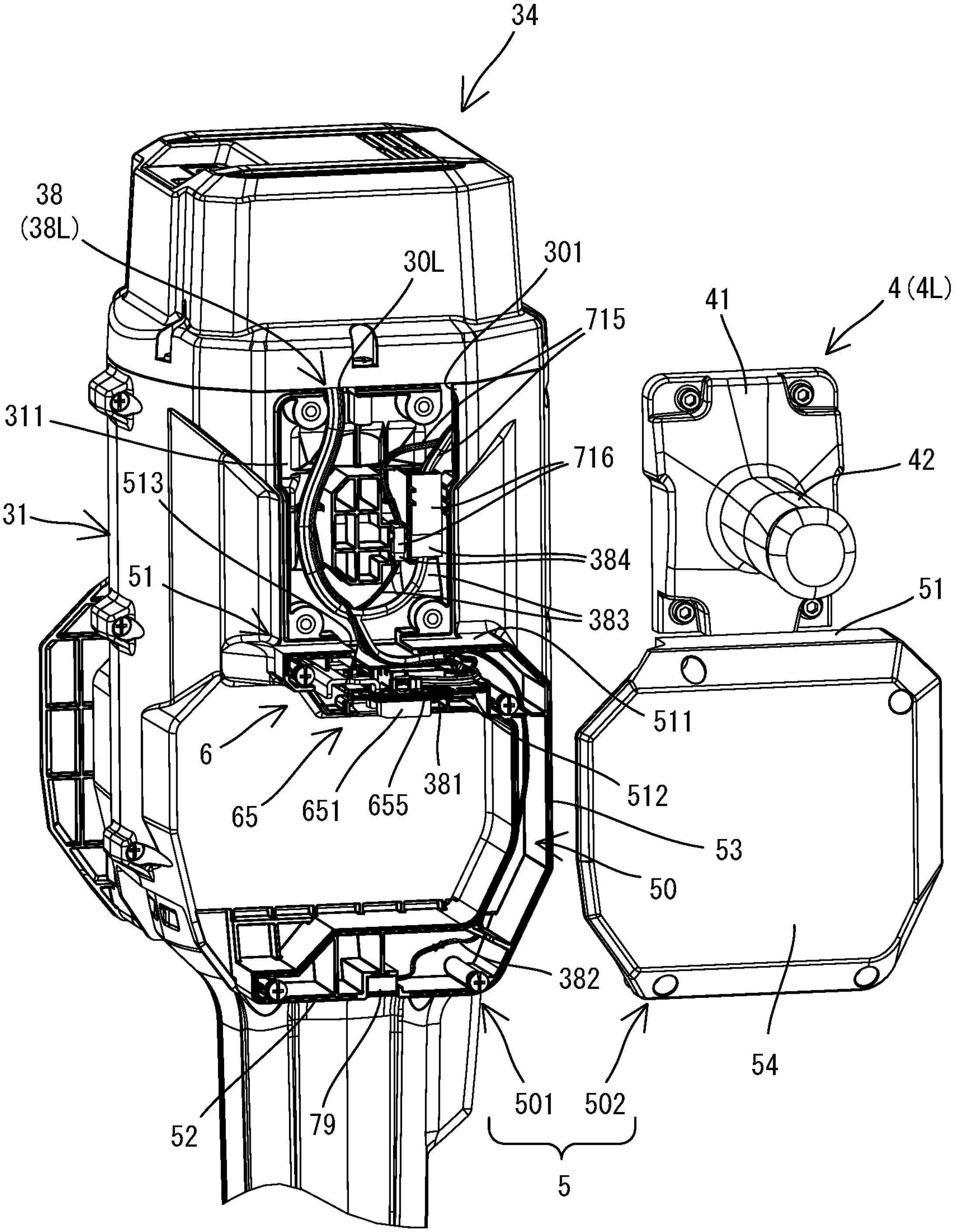

FIG. 14 is a perspective view of the hammer, from which a left handle and a cover part of a left battery housing are separated.

Figure 15:
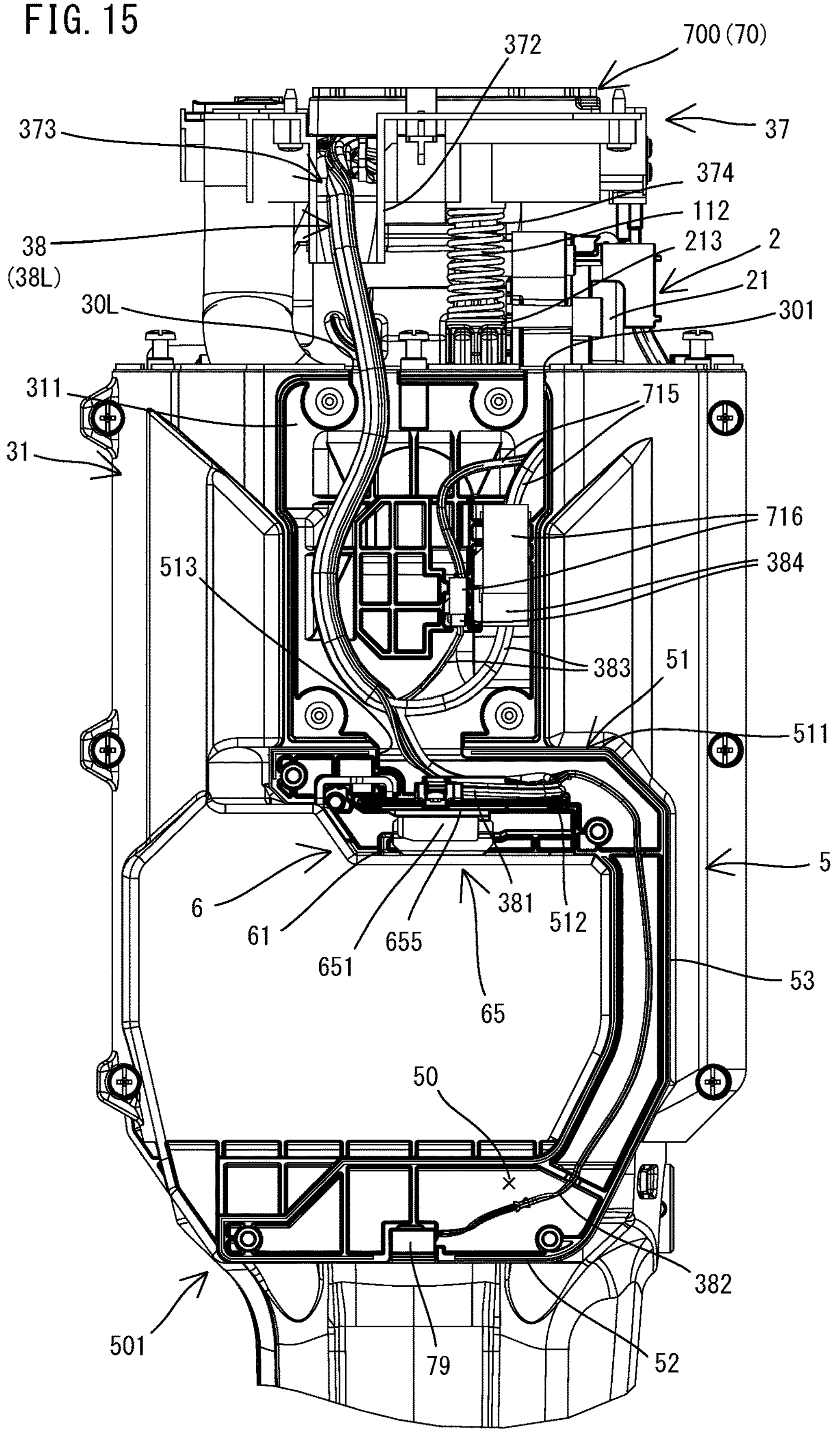

FIG. 15 is a left view of the hammer without the top cover, the left handle and the cover part of the left battery housing.

DESCRIPTION OF EMBODIMENTS

In one non-limiting embodiment according to the present disclosure, the second housing may include a second housing body and a case. The second housing body may have the at least one opening. The case may be fixedly coupled to the second housing body and house the controller. The case may have a partition wall part and at least one guide. The partition wall part may be spaced apart from the first housing and disposed between the controller and the first housing. The at least one guide may be configured to guide (direct, lead) the at least one electric wire extending from the controller toward an outside of the case and toward the at least one opening. According to this embodiment, the partition wall part can effectively isolate the controller from the vibration of the first housing. Further, the at least one guide can effectively reduce a possibility that the at least one electric wire extending from the controller touches (makes a physical contact with) the first housing within the second housing.

In addition or in the alternative to the preceding embodiment, the second housing may include a first portion and a second portion. The first portion may house the controller. The second portion may be coupled to the first portion. The at least one opening of the second housing may be at least one recess (notch) formed at a connecting edge of the first portion that is connected to the second portion or at a connecting edge of the second portion that is connected to the first portion. According to this embodiment, the at least one electric wire from the controller can be led to the outside of the second housing at a position that is relatively close to the controller. Thus, a possibility that the at least one electric wire touches the first housing can be reduced when the first housing vibrates. Further, the assembler only needs to arrange the at least one electric wire such that it passes through the at least one recess and then couple the first portion to the second portion. Through such a simple process, the assembler can easily lead the at least one electric wire to the outside of the second housing.

In addition or in the alternative to the preceding embodiments, the power tool may further include at least one battery mount part that is configured to removable receive a battery. The at least one battery mount part may be disposed outside the second housing. The at least one battery mount part may include a terminal that is configured to electrically connect to a terminal of the battery when the battery is received by (mounted to) the at least one battery mount part. The at least one electric wire extending from the controller may include at least one terminal wire that is connected to the terminal of the at least one battery mount part.

According to this embodiment, the assembler can easily connect the terminal wire, which extends out of the second housing through the opening of the second housing, to the terminal of the battery mount part, outside the second housing. The terminal wire may be directly connected to the terminal of the battery mount part, outside the second housing. Alternatively, the terminal wire may be directly connected to at least one electric wire extending from the terminal of the battery mount part, outside the second housing. Further alternatively, the terminal wire may be connected to at least one electric wire extending from the terminal of the battery mount part via at least one connecting component (e.g., a connector, a coupler, a terminal, etc.) that is separate (discrete) from the electric wire, outside the second housing. The term "(being) connected" hereinafter includes the above-described three connecting modes unless otherwise specifically described.

In addition or in the alternative to the preceding embodiments, the power tool may further include at least one handle that includes a grip part. The at least one handle may be fixedly coupled to the second housing outside the second housing. Further, the at least one handle may be configured to at least partially cover the at least one electric wire outside the second housing. According to this embodiment, since the at least one handle is coupled to the second housing to form an integral unit, the transmission of the vibration to the at least one handle can be suppressed. Further, the at least one handle can protect at least a portion of the at least one electric wire extending out of the second housing through the at least one opening.

In addition or in the alternative to the preceding embodiments, the power tool may further include a switch that is configured to activate the motor. The switch may be housed in the at least one handle. The at least one electric wire extending from the controller may include a switch wire that is connected to the switch. According to this embodiment, the assembler can easily connect the switch wire, which extends out of the second housing through the at least one opening, to the switch outside the second housing.

In addition or in the alternative to the preceding embodiments, the at least one handle may be located between the controller and the at least one battery mount part in the first direction. According to this embodiment, the at least one handle can easily cover and protect at least a portion of the terminal wire.

In addition or in the alternative to the preceding embodiments, the at least one battery mount part may have a wall part that is disposed adjacent to the at least one handle and that extends outward of the second housing. The terminal of the at least one battery mount part may be supported by the wall part. The terminal wire may pass through an opening formed at (in) the wall part and may be connected to the terminal of the at least one battery mount part. According to this embodiment, an efficient route (path) for the terminal wire can be formed.

In addition or in the alternative to the preceding embodiments, the at least one handle may include two handles that are on opposite sides of the second housing in a second direction that is orthogonal to the driving axis. Each of the grip parts of the two handles extends along an axis extending in the second direction. According to this embodiment, the power tool can be made suitable to be used with the grip parts being held by both hands of a user and the tool accessory being directed downward.

In addition or in the alternative to the preceding embodiments, the at least one battery mount part may include two battery mount parts that are disposed adjacent to the two handles, respectively, on opposite sides of the second housing in the second direction. The at least one opening may include two openings formed at (in) opposite side portions of the second housing in the second direction. The at least one terminal wire may include two terminal wires that extend to the outside of the second housing through the two openings and that are connected to the terminals of the two battery mount parts, respectively. According to this embodiment, a weight balance can be optimized in the second direction. Thus, the user can perform a hammering operation while stably holding the power tool.

In addition or in the alternative to the preceding embodiments, the power tool may further include a switch that is configured to activate the motor. The switch may be housed in a first one of the two handles. The at least one electric wire extending from the controller may include a switch wire and a motor wire. The switch wire may be connected to the switch. The motor wire may be connected to an electric wire extending from the motor, outside the second housing and inside a second one of the two handles. According to this embodiment, the assembler can easily connect the motor wire to the electric wire extending from the motor, outside the second housing. Further, the electric wires and the switch can be effectively protected by the two handles.

In addition or in the alternative to the preceding embodiments, the second housing may include an inner wall part. A passage that is separated (partitioned, isolated) from the first housing by the inner wall part may be defined within the second housing. The electric wire extending from the motor may pass through the passage and extends out of the second housing. According to this embodiment, a possibility that a portion of the electric wire extending from the motor within the second housing touches the first housing can be reduced when the first housing vibrates, so that deterioration of the electric wire can be suppressed.

An electric hammer (also called as a breaker hammer or a demolition hammer) 1 according to a representative, non-limiting embodiment of the present disclosure is now descried with reference to the drawings. The electric hammer 1 is hereinafter simply referred to as the hammer 1. The hammer 1 is an example of a power tool having a hammer mechanism that is configured to linearly drive a tool accessory (for example, a hammer bit) along a specified driving axis A1.

First, the general structure of the hammer 1 is described.

Figure 1:
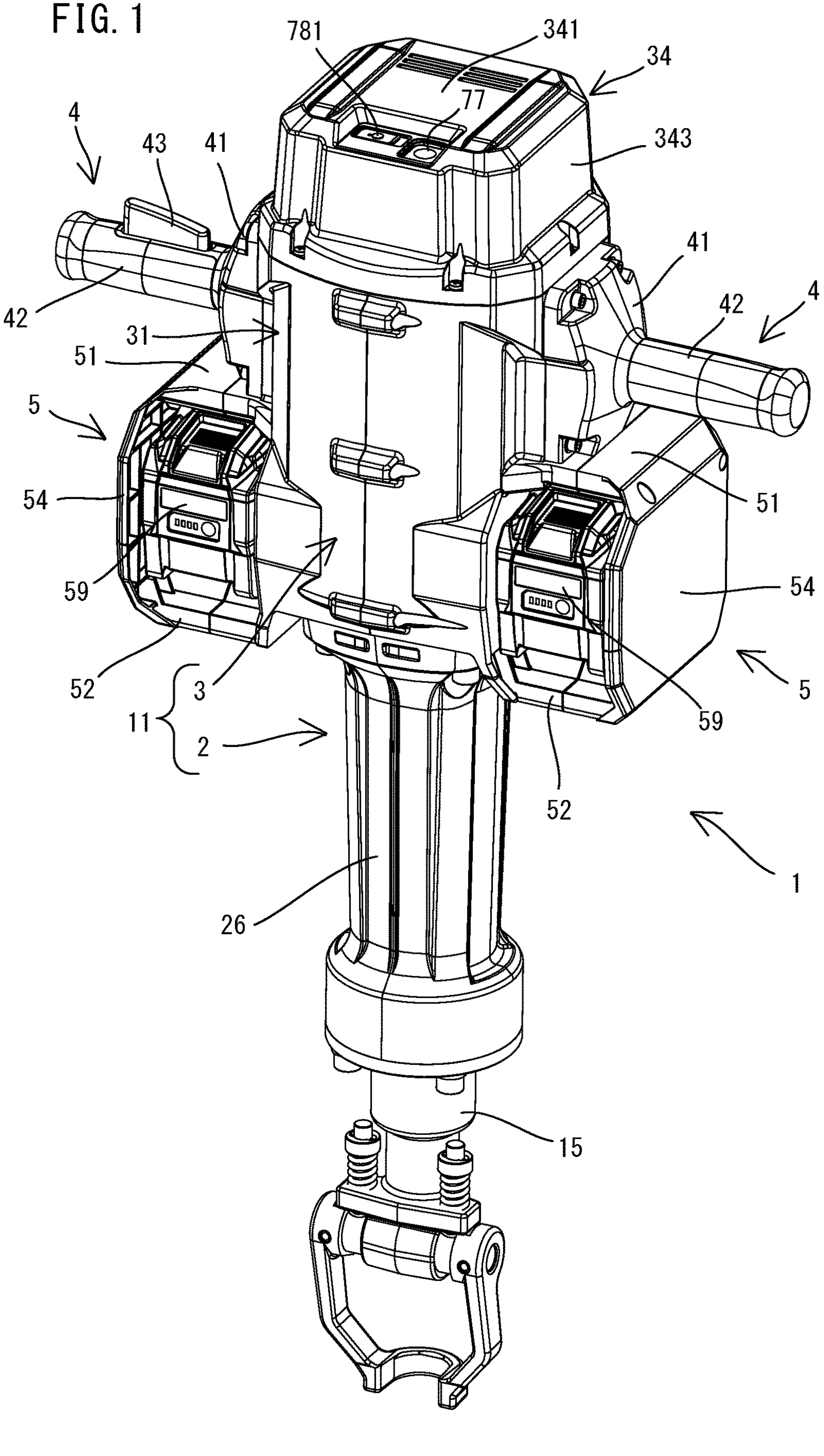
FIG. 1 is a perspective view of a hammer according to one embodiment of the present disclosure.
Figure 2:
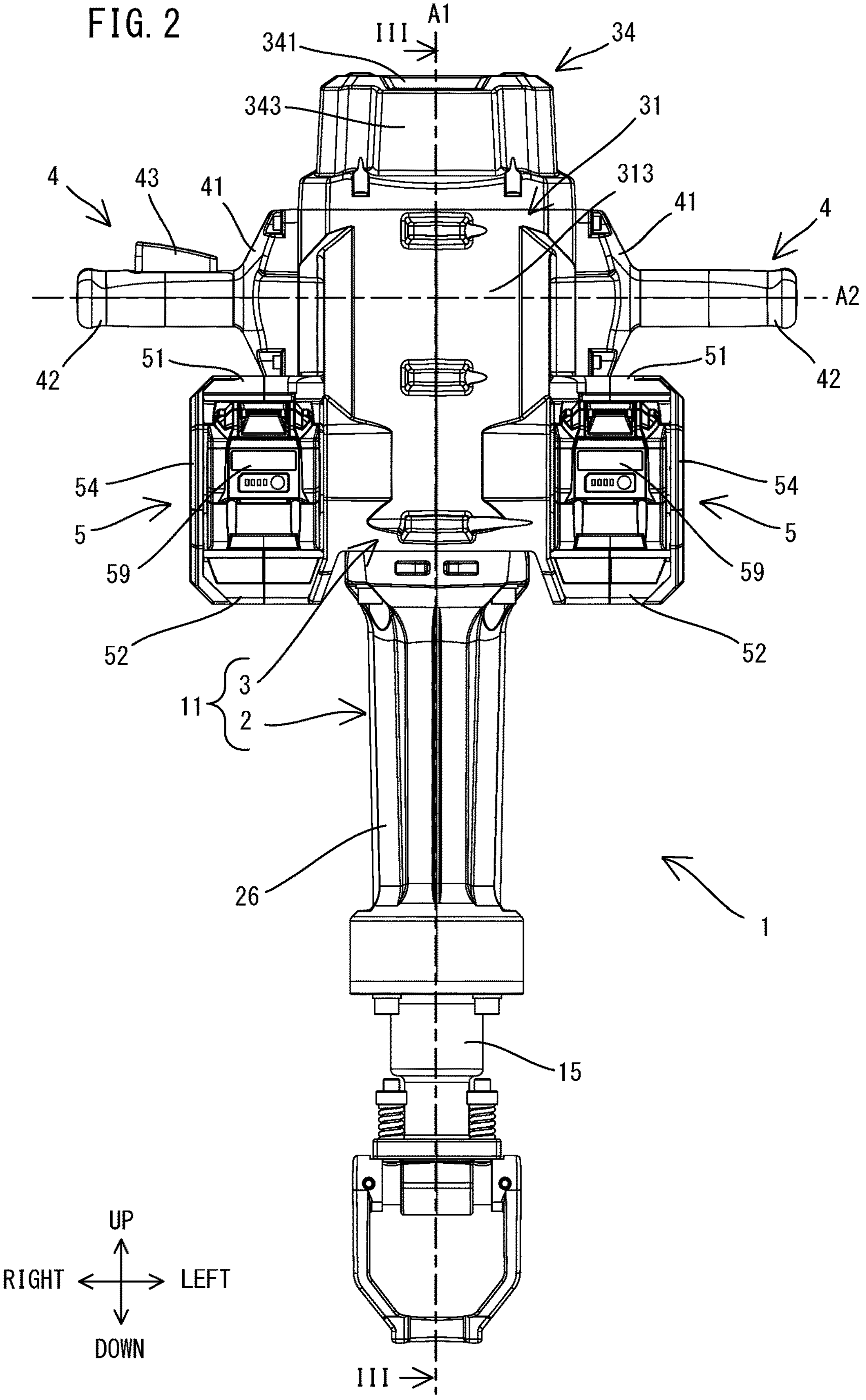
FIG. 2 is a front view of the hammer.

As shown in FIGS. 1 and 2, the hammer 1 mainly includes a housing 11, a tool holder 15, a pair of (two) handles 4, and a pair of (two) battery housings 5.

The housing 11 is an elongate housing (casing) that extends along the driving axis A1. The tool holder 15 is coupled to one end portion of the housing 11 in the longitudinal direction of the housing 11, and extends along the driving axis A1. The tool holder 15 is configured to removably hold the tool accessory (not shown). Each of the handles 4 includes a grip part 42 configured to be gripped (held) by a user. The handles 4 are coupled to the other end portion of the housing 11 in its longitudinal direction such that the grip parts 42 extend from the housing 11 in opposite directions to each other. In this embodiment, each of the grip parts 42 extends along an axis A2 that is substantially orthogonal to the driving axis A1. Owing to such an arrangement, the housing 11 and the two handles 4 form a T-shape when viewed in a direction that is orthogonal to the driving axis A1 and the axis A2. A trigger 43 is disposed on the grip part 42 of one of the two handles 4.

Generally, the user holds the two grip parts 42 with his/her left and right hands and uses the hammer 1 such that the tool accessory mounted to the tool holder 15 extends downward. Therefore, for the sake of convenience in the following description, the extension direction of the driving axis A1 (or the longitudinal direction of the housing 11 and the tool holder 15) is defined as an up-down direction of the hammer 1. In the up-down direction, the side on which the tool holder 15 is located is defined as a lower side of the hammer 1, while the opposite side (the side on which the handles 4 are located) is defined as an upper side of the hammer 1. An extension direction of the axis A2 (or the grip parts 42) is defined as a left-right direction of the hammer 1. In the left-right direction, the side on which the grip part 42 with the trigger 43 is located is defined as a right side of the hammer 1, while the opposite side (the side on which the grip par 42 without the trigger 43 is located) is defined as a left side of the hammer 1. A direction that is orthogonal to the up-down direction and the left-right direction is defined as a front-rear direction of the hammer 1.

The battery housing 5 is configured to removably receive a battery 59. In this embodiment, two battery housings 5 are respectively disposed below and adjacent to the two handles 4. The hammer 1 is thus powered by the two batteries 59 that are received by (mounted to) the battery housings 5. Specifically, when the trigger 43 is depressed by the user, a motor 71 (see FIGS. 3 and 4) is driven and thus the tool accessory is linearly driven.

The detailed structure of the hammer 1 is now described.

Figure 3:
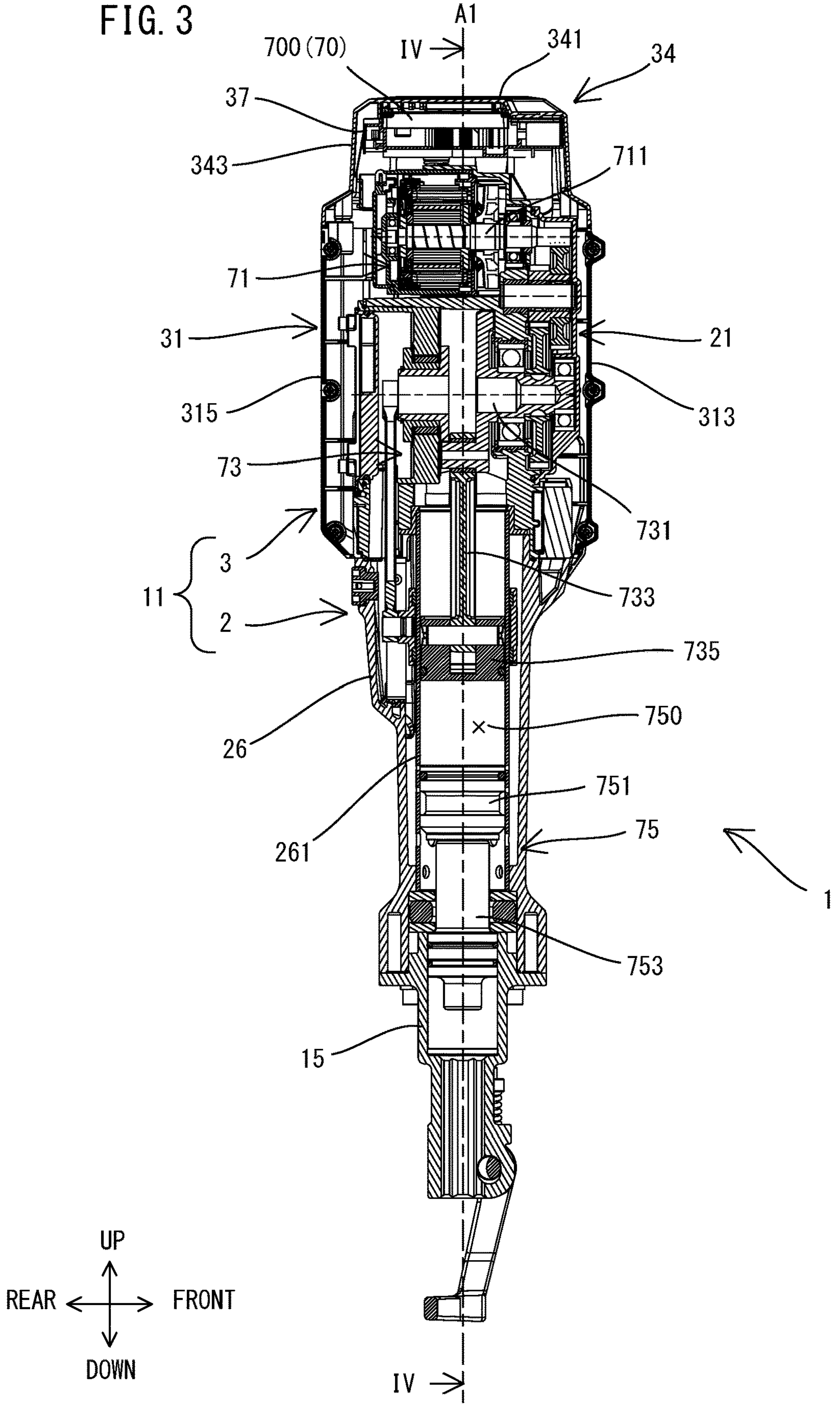
FIG. 3 is a sectional view taken along line III-III in FIG. 2.

As shown in FIGS. 3 and 4, the housing 11 includes a first housing 2 and a second housing 3. The first housing 2 and the second housing 3 are coupled to each other such that the first housing 2 and the second housing 3 are movable relative to each other in the extension direction of the driving axis A1, i.e., in the up-down direction.

The first housing 2 and the elements disposed within the first housing 2 are now described.

The first housing 2 houses the motor 71 and a driving mechanism (hammer mechanism) for the tool accessory (specifically, a motion converting mechanism 73 and a striking mechanism 75). Thus, the first housing 2 may also be referred to as a driving-mechanism housing. The first housing 2 includes an upper housing part 21 and a lower housing part 26 that is coupled to a lower end of the upper housing part 21.

The upper housing part 21 mainly houses the motor 71 and a portion of the motion converting mechanism 73. The motor 71 is disposed within an upper portion of the upper housing part 21. The motor 71 of this embodiment is a brushless motor. The motion converting mechanism 73 is disposed below the motor 71. The motion converting mechanism 73 is configured to convert rotation into linear motion. In this embodiment, a well-known piston-crank mechanism is employed as the motion converting mechanism 73. The motion converting mechanism 73 includes a crank shaft 731 and a piston 735. The crank shaft 731 is operably coupled to an output shaft 711 of the motor 71 and has an eccentric pin. The piston 735 is operably coupled to the eccentric pin via a connection rod 733. The motor 71 and the motion converting mechanism 73 are arranged such that a rotational axis of the output shaft 711 and a rotational axis of the crank shaft 731 each extend in the front-rear direction so as to be orthogonal to the driving axis A1.

The lower housing part 26 has a generally cylindrical shape as a whole. The lower housing part 26 is also referred to as a barrel part. In this embodiment, the lower housing part 26 is a member that is originally separate (discrete) from the upper housing part 21. The lower housing part 26 is fixed to the lower end of the upper housing part 21 so as to extend along the driving axis A1. The tool holder 15 is fixed to a lower end of the lower housing part 26. The lower housing part 26 houses a cylinder 261. The piston 735 and the striking mechanism 75 are disposed within the cylinder 261. The piston 735 reciprocates and slides in the up-down direction within the cylinder 261 in response to the driving of the motor 71. The striking mechanism 75 of this embodiment has a well-known structure including a striker 751 and an impact bolt 753. The striking mechanism 75 is driven in response to pressure fluctuation of an air chamber 750 that is caused by reciprocating motion of the piston 735 to thereby linearly drive the tool accessory along the driving axis A1.

The second housing 3 and the elements disposed within the second housing 3 are now described.

As shown in FIGS. 1 to 5, the second housing 3 is basically a box-like body having an open bottom end. The second housing 3 is configured to cover an upper portion of the first housing 2 (specifically, a substantial entirety of the upper housing part 21). Thus, the second housing 3 may also be referred to as an outer housing or an outer cover. The second housing 3 of this embodiment includes a main cover 31, a top cover 34, and a controller case 37 that are fixedly coupled to each other.

The main cover 31 is a tubular member and is disposed around (surrounds, encircles) an outer peripheral portion of the upper housing part 21. The main cover 31 includes a pair of left and right side wall parts 311, a front wall part 313 and a rear wall part 315. The front wall part 313 and the rear wall part 315 each connect the left side wall part 311 and the right side wall part 311. The main cover 315 of this embodiment is formed by two halves (a left shell and a right shell) that are fixedly coupled to each other in the left-right direction.

The top cover 34 is basically a box-like body having an open bottom end. The top cover 34 includes an upper wall part 341, and a peripheral wall part 343 that extends downward from a peripheral edge of the upper wall part 341. A lower end portion of the peripheral wall part 343 is fastened to an upper end portion of the main cover 31 via screws. The upper end portion (specifically, a portion of a housing part for the motor 71) of the first housing 2 (the upper housing part 21) protrudes upward relative to an upper end of the main cover 31 into the top cover 34. An upper end of the first housing 2 is below the upper wall part 341 of the top cover 34, and thus a space is formed between the upper end of the first housing 2 and the top cover 34. The controller case 37 is disposed in this space within the top cover 34 and is coupled to the top cover 34.

Figure 5:
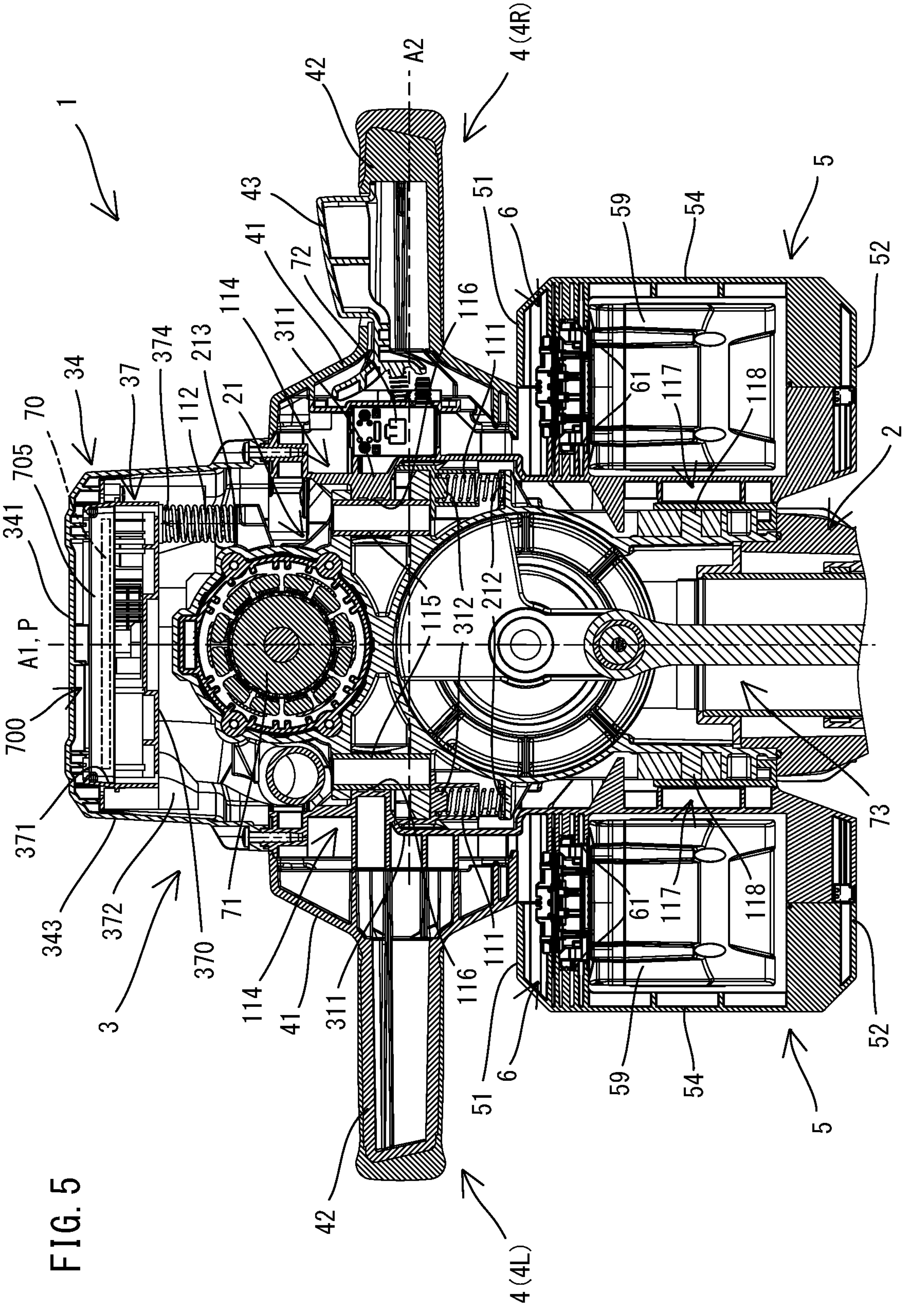
FIG. 5 is a partial, enlarged view of FIG. 4.

As shown in FIG. 5, the controller case 37 mainly houses (retains) a controller 70. The controller 70 is configured to control the operation of the hammer 1 (e.g., the driving of the motor 71). In this embodiment, the controller 70 is a microcomputer that includes a CPU, a ROM, a memory, etc., and is mounted on a control circuit board. The microcomputer is supported by a heat sink 705 and forms an integrated controller assembly 700 together with the heat sink 705. However, a control circuit other than the microcomputer may be employed as the controller 70. The microcomputer (or the control circuit) need not necessarily be integrated with the heat sink 705.

As shown in FIGS. 5 to 8, a recess 371 that is open upward is formed in a central portion of the controller case 37. The recess 371 has a shape that matches (conforms to) the shape of the controller assembly 700 (specifically, a rectangular shape that is elongated in the left-right direction in a top view). The controller assembly 700 is fitted into the recess 371.

The controller case 37 has two elastically-deformable (resilient, flexible) engagement pieces 379. The two engagement pieces 379 are disposed adjacent to a left edge and a right edge of the recess 371, respectively. A distal end portion of each of the engagement pieces 379 has a claw (protrusion) that protrudes toward the central portion of the recess 371. When an assembler (a worker who assembles the hammer 1) inserts the controller assembly 700 into the controller case 37, each of the engagement pieces 379 bends away from the recess 371 so as to allow the controller assembly 700 to be fitted into the recess 371. The engagement pieces 379 return to their original positions when the controller assembly 700 is placed in the recess 371, and thus the claws of the engagement pieces 379 engage with an upper surface of the controller assembly 700. Consequently, the engagement pieces 379 prevent the controller assembly 700 from dropping off from the recess 371.

In this manner, the engagement pieces 379 snap-engage with the controller assembly 700, so that the controller assembly 700 is temporarily (provisionally) fixed (secured) to the controller case 37. The phrase "to temporarily fix a component" herein means to fix (secure) or retain a component while a slight movement of the component is allowed, or while removal of the component is allowed in response to a certain amount of an external force being applied to the component.

The controller case 37 is fixed to the top cover 34 (specifically, to the upper wall part 341) such that the controller assembly 700 housed in the recess 371 faces (opposes) the upper wall part 341 of the top cover 34. A bottom wall part 370 of the controller case 37 is spaced apart upward from the upper end of the first housing 2 (see FIG. 5).

In this embodiment, the controller case 37 has a function of temporarily fixing the controller assembly 700, so that the assembler can handle the controller 70 and the controller case 37 as an integral (single) unit. For example, even when the controller case 37 is oriented such that the bottom wall part 370 faces upward and the controller assembly 700 faces downward (toward the ground) (i.e., the controller case 37 is turned upside down) in the vertical direction, the controller assembly 700 does not drop off from the controller case 37. Thus, the assembler can place the top cover 34 on a workbench such that the open bottom end of the top cover 34 is directed upward and then fix (fasten) the controller case 37, which is turned upside down, to the top cover 34 using screws from above. Thus, efficiency of the assembling can be enhanced.

Figure 6:
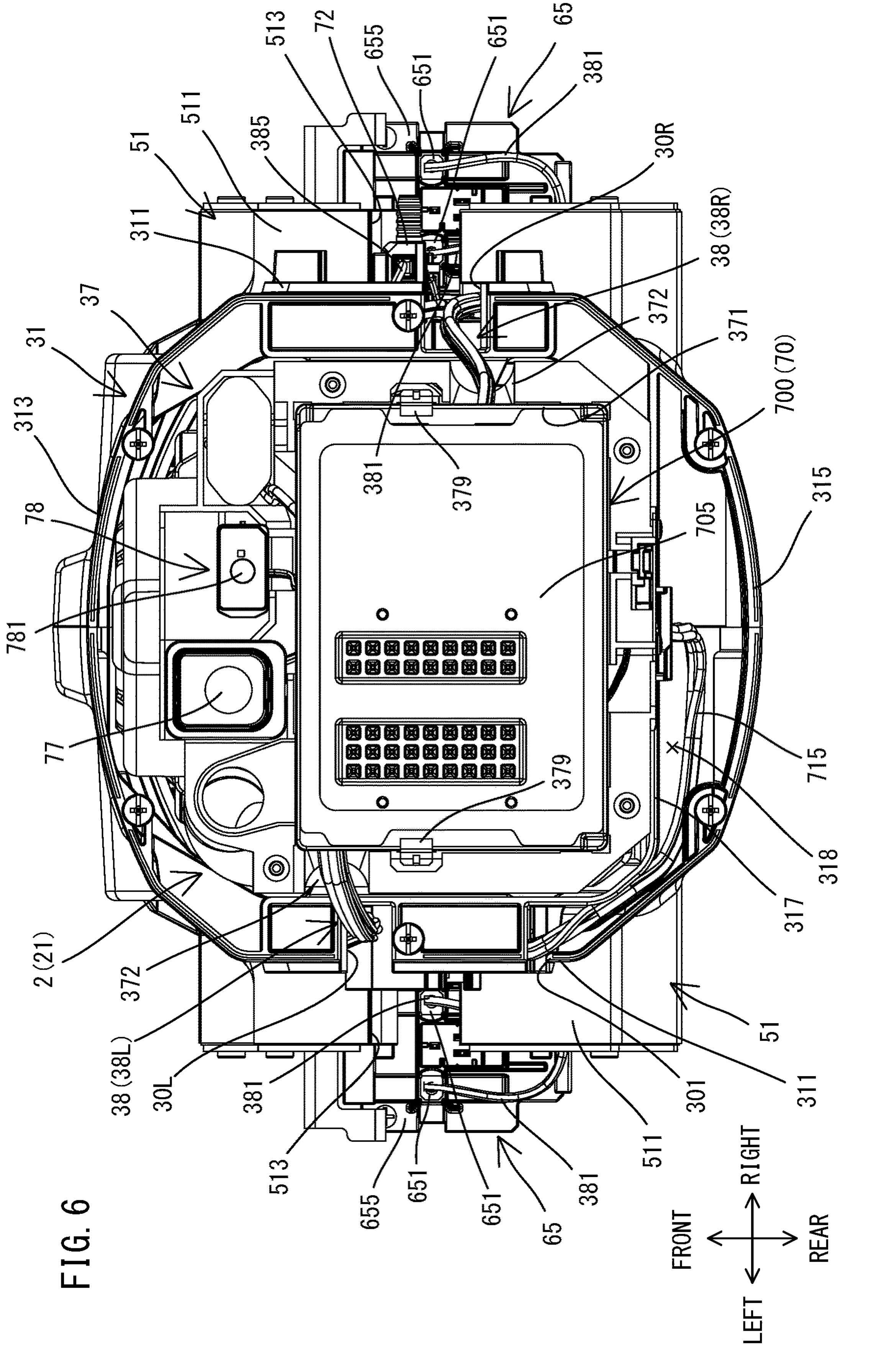
FIG. 6 is a top view of the hammer without a top cover.

In this embodiment, the controller case 37 supports a main power switch 77 and a wireless unit 78 in addition to the controller 70 (see FIG. 6). The main power switch 77 is configured to turn ON/OFF supply of electric power to the hammer 1. When the main power switch 77 is ON, the electric power is supplied from the battery 59 to the controller 70, etc. The wireless unit 78 is a known device that is configured to transmit and receive signals, via wireless communication, to and from an external device (for example, a dust collector) that is used together with the hammer 1. The wireless unit 78 is configured to communicate with the external device for correlating each other (so-called pairing) when an activation button 781 is turned ON.

The main power switch 77 and the wireless unit 78 are fitted into recesses 375, 376 (see FIG. 8), respectively, that are provided on the controller case 37, adjacent to the recess 371. Although not shown in detail, the main power switch 77 and the wireless unit 78 are each electrically connected to the controller 70 via electric wires, which extend from lower sides of the main power switch 77 and the wireless unit 78, respectively. The main power switch 77 and the activation button 781 of the wireless unit 78 are exposed to an outside of the top cover 34 through respective openings formed through the top cover 34 to which the controller case 37 is fixed (see FIG. 1). Thus, the user can manipulate the main power switch 77 and the activation button 781 of the wireless unit 78 from the outside of the top cover 34.

Further, as shown in FIGS. 6 to 9, the controller case 37 is configured to guide (direct, lead) various electric wires 38 extending from the controller 70. More specifically, wire guides 372 are respectively provided on a left side portion and a right side portion of the controller case 37. Each of the wire guides 372 is a wall part that defines a passage 373 that communicates with an inner space of the recess 371. The wire guide 372 of this embodiment is a wall part having a generally U-shaped section. Each passage 373 extends downward in a gently curved manner from the recess 371 toward an edge of the controller case 37. The electric wires 38 extending from the controller 70 are separated into an electric wire group 38L extending leftward and an electric wire group 38R extending rightward. The electric wire group 38L and the electric wire group 38R are guided by the left wire guide 372 and the right wire guide 372, respectively, to the outside of the controller case 37. These electric wires 38 are connected to terminals 651 (see FIG. 6) of battery mount parts 6, etc. The arrangement of the electric wires (wiring) in the hammer 1 is described in detail later.

The handles 4 and the elements disposed within the handles 4 are now described. In the following description, for the sake of convenience, when referring to the two handles 4 collectively or referring to one of the two handles 4 without distinction, the two handles 4 or one of the handles 4 is simply called the handles/handle 4. Further, when particularly referring to the handle 4 with the trigger 43, it is specifically called a right handle 4R. When particularly referring to the handle 4 without the trigger 43, it is specifically called a left handle 4L.

As shown in FIG. 5, the two handles 4 are symmetrically arranged relative to a plane P that passes the center of the hammer 1 in the left-right direction. The plane P is also a plane that contains the driving axis A1 and the rotational axis of the output shaft 711 of the motor 71. The two handles 4 have substantially the same structure, except that only the right handle 4R supports the trigger 43. In this embodiment, the handle 4 is a member that is originally separate (discrete) from the second housing 3 and that is fixedly coupled to the second housing 3. Each of the handles 4 includes a base part 41 and the grip part 42.

The base part 41 is mounted on (coupled to) the side wall part 311 of the second housing 3 (specifically, the main cover 31). The base part 41 basically has a box-like shape having an open side. The base part 41 is configured to generally cover an upper half of the side wall part 311. An edge portion of the base part 41 at the open side is fastened to the side wall part 311 via screws. Thus, the handle 4 is integrated with the second housing 3.

The grip part 42 has a bottomed-tubular shape, The grip part 42 is coupled to the base part 41 such that an inner space of the grip part 42 communicates with an inner space of the base part 41. In this embodiment, the base part 41 and the grip part 42 are formed integrally with each other. Alternatively, the base part 41 and the grip part 42 may be originally separate (discrete) members and may be fixed to each other. Only the grip part 42 of the right handle 4R has an opening, through which the trigger 43 is exposed to the outside, formed through the upper portion of the grip part 42.

The trigger 43 is supported by the right handle 4R to be pivotable in the substantially up-down direction. The trigger 43 is normally kept at an OFF position where a portion of the trigger 43 protrudes upward through the opening of the grip part 42 of the right handle 4R, owing to a biasing force of a spring. When the use depresses the trigger 43 downward while gripping the grip part 42 of the right handle 4R with his/her hand, the trigger 43 is pivoted downward.

The base part 41 of the right handle 4R houses a switch 72 that is configured to activate the motor 71. More specifically, ribs protrude rightward from an outer surface of the right side wall part 311 of the main cover 31. The switch 72 is fitted in a recess defined by the ribs and thus supported on (by) the right side wall part 311 (see FIG. 10). When the trigger 43 is at the OFF position, the switch 72 is kept OFF. When the trigger 43 is depressed by the user and is pivoted to an ON position, a portion of the trigger 43 presses a plunger of the switch 72, so that the switch 72 is turned ON. The controller 70 drives the motor 4 while the switch 72 is ON.

The structure of the battery housing 5 is now described.

As shown in FIG. 5, the two battery housings 5 are disposed directly below and adjacent to the two handles 4 and protrude leftward and rightward from the side wall parts 311 of the second housing 3 (specifically, the main cover 31), respectively. The two battery housings 5 are substantially symmetrically arranged relative to the plane P and have substantially the same structure. Owing to such an arrangement of the battery housings 5, a weight balance of the hammer 1 in the left-right direction can be optimized when the two batteries 59 are mounted to the two battery housings 5. When the two batteries 59 are mounted on the battery housings 5, the gravity center of the hammer 1 with the tool accessory directed downward shifts downward, so that the user can stably hold the hammer 1 to perform a hammering operation.

As shown in FIGS. 5, 10 and 11, each of the battery housings 5 is formed by an upper wall part 51, a lower wall part 52, a rear wall part 53 and a side wall part 54. The side wall part 54 has a substantially rectangular shape that conforms to the shape of the battery 59. The side wall part 54 is spaced away from the side wall part 311 of the main cover 31 in a sideward direction (leftward or rightward) and is generally parallel to the side wall part 311. The upper wall part 51, the lower wall part 52 and the rear wall part 53 protrude from the side wall part 311 of the main cover 31 in the sideward direction (leftward or rightward) and are connected to an upper edge, a lower edge and a rear edge of the side wall part 54, respectively. With such a structure, the battery housing 5 defines a space with an open front for housing the battery 59.

In this embodiment, each of the upper wall part 51, the lower wall part 52 and the rear wall part 53 has a double-walled structure. Thus, each of the upper wall part 51, the lower wall part 52 and the rear wall part 53 has an inner space therein. The inner spaces of the upper wall part 51, the lower wall part 52 and the rear wall part 53 are continuous with each other, so that the inner spaces together form an integral inner space 50 of the battery housing 5.

In this embodiment, each of the battery housings 5 includes a base part 501 and a cover part 502. The base part 501 is formed integrally with the side wall part 311 of the main cover 31. The cover part 502 is a member that is originally separate (discrete) from the base part 501 and is fastened to the base part 501 via screws (see FIG. 10). The base part 501 includes generally left or right halves of the upper wall part 51, the lower wall part 52, and the rear wall part 53. The cover part 502 includes remaining right or left halves of the upper wall part 51, the lower wall part 52, and the rear wall part 53, as well as the side wall part 64.

The battery housing 5 has the battery mount part 6. The battery mount part 6 is configured to removably receive the battery 59. The battery 59 is a well-known rechargeable battery (also called a battery pack) and has a generally rectangular box-like case and a plurality of cells housed in the case. The battery 59 can be selectively mounted on various power tools, including the hammer 1.

The battery mount part 6 includes an engagement part 61 that is physically engageable with the battery 59, and a terminal part 65 that is electrically connectable to terminals of the battery 59.

The engagement part 61 includes a pair of (two) rails, of which the detailed illustration is omitted because it is a well-known structure. The rails are disposed below and adjacent to the upper wall part 51. The rails are spaced apart from each other in the left-right direction, and extend in parallel to each other in the front-rear direction. The two rails are configured to slidably engage with two grooves formed on an upper end portion of the case of the battery 59.

The terminal part 65 includes a plate-like base (support) 655 and a plurality of terminals 651 supported by the base 655. The terminals 651 at least include one pair of electrode terminals. The terminal part 65 may also be called a terminal assembly or a terminal base/block. When the base part 501 and the cover part 502 of the battery housing 5 are coupled to each other, the terminal part 65 is held between and supported (held) by the two halves of the upper wall part 51. As described above, the upper wall part 51 has the double-walled structure. Specifically, the upper wall part 51 includes a first upper wall 511 and a second upper wall 512 that is disposed below the first upper wall 511. The base 655 of the terminal part 65 is accommodated in the inner space of the upper wall part 51 formed between the first upper wall 511 and the second upper wall 512. A portion of the terminal 651 is exposed to the upper side of the base 655. Another portion of the terminal 651 protrudes downward of the upper wall part 51 through an opening formed through the second upper wall 512.

When the user engages the grooves of the battery 59 with the rails of the engagement part 61 and then slides the battery 59 rearward from the front side of the battery housing 5 to a specified position, the terminals of the battery 59 get into contact with the terminals 651 of the battery mount part 6, so that the terminals of the battery 59 are electrically connected to the terminals 651 of the battery mount part 6. When the battery 59 reaches the specified position, a locking member of the battery 59 engages with a recess formed on the engagement part 61, so that the battery 59 is locked (retained) in the specified position. In this manner, when the battery 59 is mounted to the battery mount part 6, the battery housing 5 substantially covers a portion of the battery 59 other than the front surface of the battery 59. Thus, the battery housing 5 also functions as a protector that protects the battery 59 from an external force.

The lower end portion of the battery housing 5 supports an LED light 79. More specifically, the LED light 79 is fitted and supported in a recess formed on the lower wall part 52. The LED light 79 can emit light to a working area (an area where a tip end of the tool accessory is to be disposed), through an opening formed through the lower wall part 52. The controller 70 controls driving of the LED light 79.

The coupling (connecting) structure of the first housing 2 and the second housing 3 is now described.

As described above, in this embodiment, the first housing 2 and the second housing 3 are coupled (connected) to each other such that the first housing 2 and the second housing 3 are movable relative to each other in the up-down direction. As described above, the two handles 4 and the two battery housings 5 are integrated with the second housing 3. Thus, the second housing 3, the handles 4 and the battery housings 5 integrally move (i.e. move as an integral/single unit) relative to the first housing 2 in the up-down direction.

More specifically, as shown in FIG. 5, a pair of first elastic members 111 and a pair of second elastic members 112 (only one second elastic member is shown in FIG. 5) are interposed between the first housing 2 and the second housing 3 in the up-down direction. In this embodiment, a compression coil spring is employed as each of the first elastic members 111 and the second elastic members 112. The first housing 2 and the second housing 3 can move relative to each other in the up-down direction (i.e., in a direction to be closer to each other and in a direction to be farther away from each other) in a state in which biasing forces of the first elastic members 111 and the second elastic members 112 are applied thereto.

The first elastic members 111 are disposed between the first housing 2 and the second housing 3 below the grip part 42 (the axis A2). In this embodiment, the two first elastic members 111 are substantially symmetrically arranged relative to the driving axis A1 (specifically, relative to the plane P). More specifically, each of left and right side portions of the upper housing part 21 of the first housing 2 has a spring receiver 212. Each of the left and right side wall parts 311 of the main cover 31 of the second housing 3 has a spring receiver 312. The spring receivers 312 of the second housing 3 are directly above the spring receivers 212 of the first housing 2 so as to face the spring receivers 212, respectively. The first elastic member 111 extends between the spring receiver 212 and the spring receiver 312 in the up-down direction.

The second elastic members 112 are disposed between the first housing 2 and the second housing 3 above the grip part 42 (the axis A2). In this embodiment, the two second elastic members 112 are substantially symmetrically arranged relative to the driving axis A1. More specifically, the upper surface of the upper housing part 21 of the first housing 2 has two spring receivers 213 (only one of the spring receivers 213 is shown in FIG. 5). The lower surface of the controller case 37, which is fixed to the top cover 34 of the second housing 3, has two spring receivers 374 (see FIG. 9). The spring receivers 374 of the controller case 37 are directly above the spring receivers 213 of the first housing 2 so as to face the spring receivers 213, respectively. The second elastic member 112 extends between the spring receiver 213 and the spring receiver 374 in the up-down direction.

When coupling (connecting) the first housing 2 to the second housing 3, firstly, the main cover 31 is coupled to the first housing 2 via the first elastic members 111. And then, the top cover 34 is coupled to the first housing 2 via the second elastic members 112. Thereafter, the top cover 34 is fastened to the main cover 31 using screws.

The housing 11 also has a guide structure for guiding relative up-down movement between the first housing 2 and the second housing 3.

As shown in FIGS. 5 and 12, two first guide parts 114 are disposed adjacent to the grip parts 42 (the axis A2) in the up-down direction. Specifically, the first guide parts 114 are generally at the same position as the grip parts 42 in the up-down direction. In this embodiment, the two first guide parts 114 are substantially symmetrically arranged relative to the plane P. In this embodiment, each of the first guide parts 114 includes a guide tube 115 and a guide groove 116. The guide tube 115 is a hollow cylindrical metal member. The two guide tubes 115 are fixed to the left and right side portions of the upper housing part 21 of the first housing 2, respectively. The guide tube 115 extends in the up-down direction to be orthogonal to the axis A2. The guide groove 116 is defined by a curved surface and has a semicircular section. The curved surface of the guide groove 116 conforms to an outer peripheral surface of the guide tube 115. The two guide grooves 116 are formed on the inner sides of the left and right side wall parts 311 of the main cover 31 of the second housing 3, respectively. The guide tube 115 is partially disposed within the guide groove 116 to be slidable in the up-down direction along the guide groove 116.

As shown in FIGS. 5 and 13, two second guide parts 117 are disposed below the first guide parts 114 in the up-down direction. More specifically, the two second guide parts 117 are disposed adjacent to the battery housings 5 in the up-down direction. Specifically, the second guide parts 117 are generally at the same position as the battery housings 5 in the up-down direction. In this embodiment, the two second guide parts 117 are substantially symmetrically arranged relative to the plane P. In this embodiment, each of the second guide parts 117 includes a guide protrusion 118 and two guide ribs 119. The guide protrusion 118 has a rectangular section. The two guide protrusions 118 are disposed on the left and right side portions of the upper housing part 21 of the first housing 2, respectively. The guide protrusion 118 extends in the up-down direction. The two guide ribs 119 protrude from the inner side of the left or right side wall part 111 of the main cover 31 of the second housing 3 at the front and rear sides of the guide protrusion 118, respectively. Each of the guide protrusions 118 is partially disposed between the guide ribs 119 to be slidable in the up-down direction along the guide ribs 119.

Owing to the above-described structure, in an initial state, the first housing 2 and the second housing 3 are biased by the first elastic members 111 and the second elastic members 112 to be spaced away from each other in the up-down direction. Specifically, the first housing 2 is biased downward and the second housing 3 is biased upward. The first housing 2 and the second housing 3 are thus kept at their initial positions shown in FIG. 5. In the hammering operation, vibration is caused in the first housing 2 in the extension direction of the driving axis A1 (i.e., in the up-down direction). The first housing 2 and the second housing 3 move relative to each other in response to the vibration while receiving the biasing forces of the first elastic members 111 and the second elastic members 112. During the relative movement, the first guide parts 114 and the second guide parts 117 stably guide the relative movement between first housing 2 and the second housing 3 in the up-down direction. Such a vibration-isolating structure can reduce transmission of the vibration from the first housing 2 to the second housing 3 and thus to the grip parts 42 gripped by the user. Further, the vibration-isolating structure can effectively protect the controller 70 housed in the second housing 3 from the vibration.

The arrangement of the electric wires (wiring) in the hammer 1, in particular, the arrangement and connection (connecting operation) of the various electric wires is now described.

Figure 7:
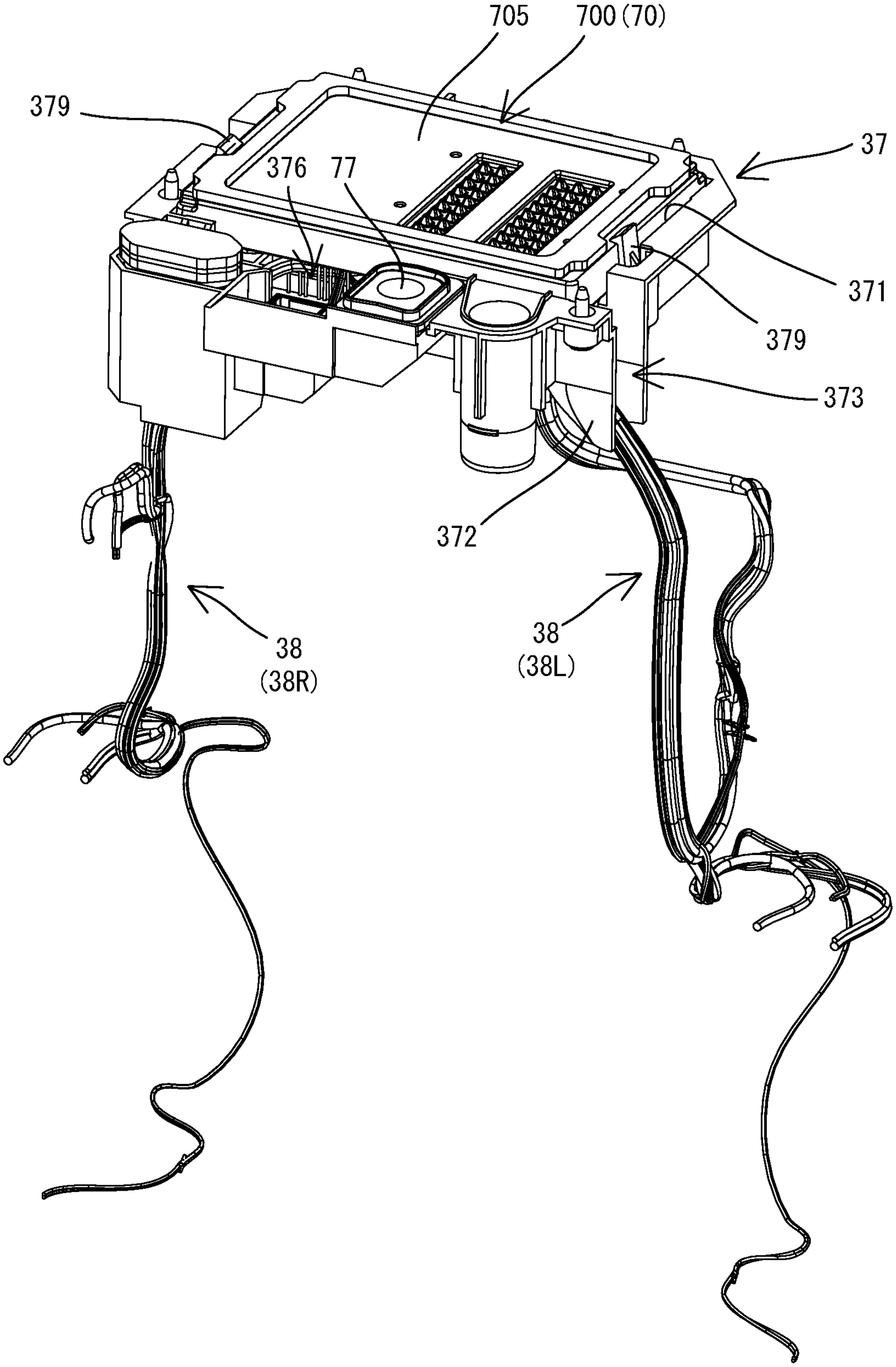

As described above, the left and right wire guides 372 respectively guide (direct, lead) the electric wire groups 38L, 38R extending from the controller 70 to the outside of the controller case 37. More specifically, as shown in FIG. 7, the left wire guide 372 guides the electric wire group 38L downward and leftward. The right wire guide 372 guides the electric wire group 38R downward and rightward. As shown in FIG. 6, a distal end (free end) of each of the wire guides 372 is located, in the left-right direction, at substantially the same position as the outer surface of the first housing 2, or slightly away from the outer surface of the first housing 2 toward the second housing 3 (i.e., between the outer surface of the first housing 2 and the inner surface of the second housing 3). Thus, the wire guides 372 guide the electric wire groups 38L, 38R outward of (away from) the first housing 2 in the left-right direction. The electric wire groups 38L, 38R exit the corresponding wire guides 372, extend downward inside the second housing 3 (the top cover 34) and further extend out of the second housing 3 through openings 30L, 30R in the second housing 3, respectively.

Each of the openings 30L, 30R communicatively connects an inner space and an outer space of the second housing 3. In other words, the inner space and the outer space of the second housing 3 are connected to each other via the openings 30L, 30R. The openings 30L, 30R are each provided for the purpose of guiding (leading) the electric wires 38, which extend from the controller case 37 within the second housing 3, out of the second housing 3. In this embodiment, the openings 30L, 30R are recesses (notches) formed at (on) the upper edges of the left and right side wall parts 311 of the main cover 31, respectively. The openings 30L, 30R are located below the wire guides 372 and at substantially the same positions as the corresponding wire guides 372 in the front-rear direction. Thus, the electric wire groups 38L, 38R are respectively guided by the wire guides 372 toward the openings 30L, 30R along the shortest routes (paths).

As shown in FIGS. 6, 14 and 15, the left electric wire group 38L comes out of the second housing 3 through the opening 30L and extends outside the left side wall part 311 and inside the handle 4. The electric wire group 38L includes, among the electric wires 38, a terminal wire (or terminal wires) 381, an LED wire (or LED wires) 382 and a motor wire (or motor wires) 383. The terminal wire 381 is connected to the terminal 651 of the left battery mount part 6. The LED wire 382 is connected to the LED light 79. The motor wire 383 is connected to an electric wire (or electric wires) 715 extending from the motor 71.

One end of the terminal wire 381 is directly (physically) connected to the terminal 651 of the terminal part 65. As described above, the terminal part 65 is supported by the upper wall part 51 of the battery housing 5 in a state in which the base 655 is disposed within the upper wall part 51 of the battery housing 5. An opening 513 is formed in a region of the first upper wall 511 of the upper wall part 51 directly above a portion of the terminal part 65. The terminal wire 381 enters the inner space of the upper wall part 51 through the opening 513 and is connected to the terminal 651 (the portion exposed above the base 655) within the upper wall part 51.

One end of the LED wire 382 is connected to the LED light 79 that is fixed to the lower wall part 52 of the battery housing 5. More specifically, the LED wire 382 enters the inner space 50 of the battery housing 5 through the opening 513 of the upper wall part 341, extends to a substantially central portion of the lower wall part 52 and is directly connected to the LED light 79.

In this manner, the opening 513 forms an effective path for the terminal wire 381 and the LED wire 382 extending from the inner space of the handle 4 into the inner space 50 of the battery housing 5. Further, the inner space 50 of the battery housing 5 is effectively utilized as a passage for the LED wire 382.

One end of the motor wire 383 is connected to a connector 384. The motor wire 383 is electrically connected to the electric wire 715 extending from the motor 71 via the connector 384.

The electric wire 715 from the motor 71 extends rearward from an upper rear portion (a rear side of the motor 71) of the upper housing part 21 of the first housing 2 to the outside of the first housing 2. Further, the electric wire 715 extends within the second housing 3 (the main cover 31) and further extends out of the second housing 3 through an opening 301 of the second housing 3.

The opening 301 communicatively connects the inner space and the outer space of the second housing 3. In other words, the inner space and the outer space of the second housing 3 are connected to each other via the opening 301. The opening 301 is provided for the purpose of guiding (leading) the electric wire 715, which extends from the motor 71, out of the second housing 3. In this embodiment, the opening 301 is a recess (notch) formed at (on) an upper edge of a rear end portion of the left side wall part 311 of the main cover 31. The opening 301 is rearward of the opening 30L through which the electric wire group 38L passes.

An inner wall part (a partition wall) 317 is provided in the main cover 31. More specifically, the inner wall part 317 is provided, corresponding to a substantially left half of the rear wall part 315 and the rear end portion of the left side wall part 311 of the main cover 31 of the second housing 3. Gaps (spaces) are formed between the inner wall part 311 and the outer surface of the upper housing part 21 and between the inner wall part 317 and the inner surfaces of the rear wall part 315 and the side wall part 311, respectively. The electric wire 715 passes through a passage 318 that is defined between the inner wall part 317 and the inner surfaces of the rear wall part 315 and the side wall part 311 of the main cover 31 and extends to the outside of the second housing 3 through the opening 301. The inner wall part 317 can protect the electric wire 715 by preventing a physical contact between the electric wire 715 and the first housing 2.

One end of the electric wire 715 is connected to a connector 716. The connector 384 for the motor wire 383 and the connector 716 for the electric wire 715 from the motor 71 are connected to each other, so that the motor wire 383 and the electric wire 715 from the motor 71 are electrically connected to each other. Ribs protrude leftward from the outer surface of the left side wall part 311 of the main cover 31. The connectors 384, 716 connected to each other are fitted in a recess that is defined by the ribs and thus supported on (by) the left side wall part 311.

As shown in FIGS. 6, 10 and 11, the right electric wire group 38R comes out of the second housing 3 through the opening 30R and extends outside the right side wall part 311 and inside the handle 4. The electric wire group 38R includes, among the electric wires 38, another terminal wire (or terminal wires) 381, another LED wire (or LED wires) 382 and a switch wire (or switch wires) 385. The terminal wire 381 is connected to the terminal 651 of the right battery mount part 6. The LED wire 382 is connected to the LED light 79. The switch wire 385 is connected to the switch 72 for activating the motor 71.

The arrangement of the terminal wire 381 and the LED wire 382 of the right electric wire group 38R is substantially the same as the arrangement of the terminal wire 381 and the LED wire 382 of the left electric wire group 38L. Specifically, the terminal wire 381 extends downward outside the right side wall part 311, enters the upper wall part 51 through the opening 513 of the battery housing 5 and is directly connected to the terminal 651 within the upper wall part 51. The LED wire 382 extends downward outside the right side wall part 311, enters the inner space 50 of the battery housing 5 through the opening 513, passes through the inner space 50 and is directly connected to the LED light 79.

The switch wire 385 extends downward outside the right side wall part 311. One end of the switch wire 385 is directly connected to the switch 72 that is held by the ribs of the side wall part 311 as described above.

As described above, various electric wires 38, which extend from the controller 70, extend to the outside of the second housing 3 through the openings 30L, 30R. Such a structure can efficiently reduce a possibility that the electric wires 38 make a physical contact with the first housing 2 when the first housing 2 vibrates, so that deterioration of the electric wires 38 can be suppressed. Accordingly, the hammer 1 of this embodiment does not require a holding member (a fastener) that fixes (fastens, secures) the electric wires 38 onto the inner surface of the second housing 3 to avoid the physical contact between the electric wires 38 and the first housing 2.

In particular, in this embodiment, the openings 30L, 30R are formed at the upper edges of the left and right side wall parts 311 of the main cover 31. The upper edge of the side wall part 311 is located at a position corresponding to the upper portion of the first housing 2 in the up-down direction. Thus, a length of a portion of the electric wire 38 that passes by (extends past) the side of the first housing 2 can be made relatively short, and the electric wire 38 can be led to the outside of the second housing 3 at a position relatively close to the controller 70.

Further, in this embodiment, the controller case 37 having the above-described structure achieves the protection of the electric wires 38 within the second housing 3 and optimized routes toward the openings 30L, 30R. Specifically, the bottom wall part 370, which is between the electric wires 38 and the first housing 2 in the up-down direction, prevents the electric wires 38 from touching the first housing 2. Further, the wire guides 372 guide the electric wires 38 away from the first housing 2 and toward the openings 30L, 30R. The controller case 37 having such a structure can more reliably reduce the possibility of the physical contact between the electric wires 38 and the first housing 2.

Further, compared to assembling a known hammer with a conventional structure, the assembler of the hammer 1 can easily connect the electric wires 38 from the controller 70 to other electric wire(s) or component(s), outside the second housing 2.

Specifically, according to a conventional arrangement of electric wires, in general, the electric wire 38 from the controller 70 housed in the top cover 34 and an electric wire from a component disposed within the main cover 31 (e.g., the motor 71 housed in the first housing 2) are connected to each other within the housing 11 (the second housing 3). In such a case, the assembler needs to connect these electric wires to each other directly or via a separate connecting component first, and then place these electric wires within the housing 11. The assembler then needs to couple the top cover 34 to the main cover 31. In such a procedure, the assembler needs to put the connected electric wires into the second housing 3 with poor visibility, so that the efficiency of the assembling is deteriorated. Further, a portion of the electric wire(s) may be clamped (caught) between the top cover 34 and the main cover 31.

On the other hand, in this embodiment, as described above, the motor wire 383 from the controller 70 and the electric wire 715 from the motor 71 both extend to the outside of the second housing 3 through the opening 30L and the opening 301, respectively. Owing to this configuration, the assembler can easily connect the motor wire 383 and the electric wire 715 outside the left side wall part 311, while looking at the motor wire 383 and the electric wire 715. It is noted that the motor wire 383 and the electric wire 715 may be directly connected without the connectors 384, 716. The connecting process of the motor wire 383 and the electric wire 715 may be performed either before or after the top cover 34 is fixed to the main cover 31. Thus, according to this embodiment, the efficiency of a wiring operation can be enhanced. Also, the possibility that a portion of the motor wire 383 and the electric wire 715 is clamped between the top cover 34 and the main cover 31 can be reduced.

In particular, in this embodiment, each of the openings 30L, 30R, 301 is a recess (notch) formed at (on) the upper edge of the side wall part 311 of the main cover 31. Therefore, the assembler only has to couple the top cover 34 and the main cover 31 in a state in which the electric wires 38, 715 extend through the corresponding openings 30L, 30R, 301, so that the electric wires 383, 715 are led to the outside of the second housing 3.

Similar to the motor wire 383, the terminal wire 381, the LED wire 382, and the switch wire 385 also extend to the outside of the second housing 3 through the openings 30L, 30R. Therefore, the assembler can easily connect these electric wires 381, 382 and 385 to the terminal 651, the LED light 79, and the switch 72 supported outside the second housing 3. In this embodiment, the terminal wire 381, the LED wire 382, and the switch wire 385 are directly connected to the terminal part 65, the LED light 79, and the switch 72 without using other separate connecting components. Since the openings 30L, 30R are recesses (notches) at the edge of the side wall part 311, not through holes, the assembler can respectively connect the terminal wire 381, the LED wire 382, and the switch wire 385 to the terminal part 65, the LED light 79, and the switch 72 first, put the terminal wire 381, the LED wire 382, and the switch wire 385 through the openings 30L, 30R, and then couple the top cover 345 and the main cover 31. Thus, according to this embodiment, not only the efficiency of the wiring operation is enhanced, but also the number of the components can be reduced.

In addition, the electric wires disposed outside the second housing 3 are mostly covered (enclosed) by the handle 4. The assembler can couple the handle 4 to the second housing 3 (the main cover 31) after connecting the electric wires 38 from the controller 70 to the corresponding components. Thus, the handle 4 of this embodiment can protect the electric wires while facilitating the wiring operation.

Similarly, the remaining portion of the electric wires disposed outside the second housing 3 is covered (enclosed) by the battery housing 5. The battery housing 5 includes the base part 501 integrated with the second housing 3, and the cover part 502 coupled to the base part 501. The assembler can first connect the electric wires 38 from the controller 70 to the corresponding components, then mount the components to the battery housing 5, and finally couple the cover part 502 to the base part 501. Thus, the battery housing 5 of this embodiment can not only protect the electric wires, but also facilitate the wiring operation.

Correspondences between the features of the above-described embodiment and the features of the present disclosure are as follows. However, the features of the embodiment are merely exemplary, and do not limit the features of the present disclosure or the present invention.

The hammer 1 is an example of a "power tool having a hammer mechanism". Each of the first elastic member 111, and the second elastic member 112 is an example of an "elastic member". Each of the openings 30L, 30R, 301 is an example of an "opening for wiring". The main cover 31 and the top cover 34 together form an example of a "second housing body". The controller case 37 is an example of a "case". The bottom wall part 370 of the controller case 37 is an example of a "partition wall part". The wire guide 372 is an example of a "guide". The top cover 34 and the controller case 37 together form an example of a "first portion" of the "second housing". The main cover 31 is an example of the "second portion" of the "second housing". The upper wall part 51 and the opening 513 of the battery housing 5 are examples of a "wall part of the battery mount part" and an "opening", respectively.

The above-described embodiment is merely exemplary, and the power tool having the hammer mechanism according to the present disclosure is not limited to the hammer 1 of the above-described embodiment. For example, the following non-limiting modifications may be made. Further, at least one of these modifications may be employed in combination with at least one of the hammer 1 of the above-described embodiment and the claimed features.

The power tool having the hammer mechanism according to the present disclosure may be embodied as a rotary hammer (hammer drill) that is capable of rotationally driving the tool accessory around the driving axis, in addition to linearly driving the tool accessory along the driving axis. Depending on the kind of the power tool, the structure and/or the arrangement of the motor and/or the driving mechanism of the tool accessory (e.g., the motion converting mechanism and the striking mechanism) may be appropriately changed to any known structure and/or arrangement.

The shapes and/or the components of the first housing 2 and the second housing 3 are not limited to those in the above-described embodiment and thus may be appropriately changed. For example, the number and/or the positions of the openings (the openings for wiring) that lead the electric wire 38 extending from the controller 70 and the electric wire 715 extending from the motor 71 to the outside of the second housing 3 may be changed in accordance with the number and/or the positions of electric wires and/or components that are connected to each other. For example, the opening(s) for wiring may be formed by (i) at least one recess (notch) that is formed at (on) the lower edge of the top cover 34 or (ii) at least one through hole that extends through at least one of the main cover 31 and the top cover 34. Further, the structure of the controller case 37 (for example, the shape, number, and/or position of the wire guide(s) 372) may be changed in accordance with the change of the opening(s) for wiring.

The elastic coupling structure between the first housing 2 and the second housing 3 (for example, the kind, number, and/or position of the elastic members interposed between the first housing 2 and the second housing 3) may be appropriately changed. The guide structure of the relative movement between the first housing 2 and the second housing 3 (for example, the structure, number, and/or position of the first guide parts 114 and the second guide parts 117) may also be appropriately changed. The number of each of the elastic members and the guide parts may be preferably two or more.

The two handles 4 may be coupled to the main cover 31 and the top cover 34 such that each of the handles 4 extends across the main cover 31 and the top cover 34. Alternatively, the handles 4 may be coupled to the top cover 34 (i.e., a portion of the second housing 3 that houses the controller 70). The number of the handles 4 may be one.

The number of the battery mount parts 6 (i.e., the number of the batteries 59 to be mounted to the hammer 1) may be one or three or more. Further, the position of the battery mount part 6 may be appropriately changed. The hammer 1 may include a power cord, instead of the battery mount part 6, so that the hammer 1 is connectable to an external power source via the power cord.

Further, in view of the nature of the present invention and the above-described embodiment, the following Aspects A1 to A4 can be provided. At least one of the following Aspects A1 to A4 can be employed in combination with at least one of the above-described embodiment, the above-described modifications and the claimed features.

(Aspect A1)

A distal end of the at least one guide is located at substantially the same position as an outer surface of the first housing or located between the outer surface and an inner surface of the second housing in a second direction that is orthogonal to the driving axis.

(Aspect A2)

The at least one electric wire extending from the controller includes a first electric wire and a second electric wire, and the at least one guide includes two guides that are configured to respectively guide the first electric wire and the second electric wire in opposite directions from each other in a second direction toward the two openings, the second direction being orthogonal to the driving axis.

(Aspect A3)

The at least one opening includes (i) at least one first opening for the at least one electric wire extending from the controller, and (ii) a second opening for the electric wire extending from the motor.

(Aspect A4)

The power tool further comprises at least one battery housing that is coupled to the second housing outside the second housing, wherein:

the at least one battery housing has the battery mount part and is configured to at least partially cover a battery mounted to the battery mount part, at least a portion of the at least one battery housing has a double-walled structure, and the at least one of the electric wire extending from the controller is partially disposed in an inner space defined by the double-walled structure.

Further, for a non-limiting purpose of improving efficiency in connecting electric wires of a power tool, following Aspects B1 to B13 can be provided. Any one of Aspects B1 to B 13 can be employed alone or in combination with any other one or more of Aspects B1 to B13. Further, at least one of Aspects B1 to B13 can be employed in combination with at least one of the hammer 1 of the above-described embodiment, the above-described modifications, Aspect A1 to A4, and the claimed features.

(Aspect B1)

A power tool having a hammer mechanism that is configured to linearly drive a tool accessory along a driving axis by striking the tool accessory, the power tool comprising:

a housing that defines the driving axis; and a controller that is configured to control an operation of the power tool, wherein:

the housing includes (i) a first housing, and (ii) a second housing that is coupled to the first housing and that houses at least the controller, and at least one electric wire extending from the controller and at least one component provided to the first housing are connected to each other outside (at an outside of) the housing.

The phrase "(being) provided to the first housing" in this Aspect covers (i) being disposed within the first housing and (ii) being supported (held) on the first housing outside the first housing. Non-limiting examples of the "component provided to the first housing" may include a motor, a switch, and a terminal that is electrically connectable to a battery.

The at least one electric wire extending from the controller housed in the second housing and the at least one component provided to the first housing may be "connected outside the housing" as in the following non-limiting three examples. The first example is that the at least one electric wire extending from the controller and at least one electric wire extending from the at least one component (typically, a motor) disposed within the first housing are directly (physically) connected to each other outside the housing. The second example is that the at least one electric wire extending from the controller and the at least one electric wire extending from the at least one component (typically, a motor) disposed within the first housing are connected to each other via at least one connecting component (e.g., a connector, a coupler, a terminal, etc.) that is separate (discrete) from the electric wire, outside the housing. The third example is that the at least one electric wire extending from the controller is directly connected to the at least one component supported (held) on the first housing outside the housing. In the following description, the phrase "(being) connected outside the housing" covers the above-described three examples unless otherwise specifically described.

According to the power tool of Aspect B1, an assembler of the power tool (a worker who assembles the power tool) can easily connect, outside the housing, the at least one electric wire from the controller housed in the second housing and the at last one component provided to the first housing, while viewing a position where the at least one electric wire is connected. Thus, efficiency of wiring can be enhanced.

(Aspect B2)

The power tool as defined in Aspect B1, wherein:

the second housing includes (i) a first portion that houses the controller, (ii) a second portion that is coupled to the first portion, at least one recess for wring is formed at a connecting edge of the first portion that is connected to the second portion or at a connecting edge of the second portion that is connected to the first portion, and the at least one recess is configured to communicatively connect an inside and an outside of the housing in a state in which the first portion and the second portion are coupled to each other.

According to Aspect B2, the assembler can simply arrange the at least one electric wire extending from the controller housed within the second housing (and the electric wire extending from the component (e.g., a motor) in the first housing) such that the at least one electric wire passes through the at least one recess first, and then couple the first portion to the second portion. Through such a simple process, the assembler can easily lead the electric wire to the outside of the housing. Further, since a wiring process may be performed either before or after coupling the first portion to the second portion, working efficiency and convenience can be enhanced.

(Aspect B3)

The power tool as defined in Aspect B1 or B2, further comprising:

at least one battery mount part that is configured to removably receive a battery, wherein:

the at least one battery mount part includes a terminal that is supported by the housing outside the housing and that is configured to electrically connect to a terminal of the battery when the battery is received by the at least one battery mount part, and the at least one electric wire includes at least one terminal wire that is directly connected to the terminal of the battery mount part.

According to Aspect B3, the number of the components can be reduced, compared to a case in which the at least one electric wire from the controller is connected to the terminal of the battery mount part via another connecting component.

(Aspect B4)

The power tool as defined in any one of Aspect B1 to B3, further comprising:

a motor that is housed in the first housing, wherein:

the second housing is configured to cover at least a portion of the first housing, and the second housing is coupled to the first housing via at least one elastic member to be movable relative to the first housing in a first direction that is parallel to the driving axis.

According to Aspect B4, the housing has a vibration-isolating structure. Therefore, even when vibration in the first direction is caused on the first housing in response to driving of the motor, the vibration to be transmitted to the controller in the second housing can be reduced. Accordingly, the controller can be protected from the vibration. Further, the electric wire disposed outside the second housing does not touch the first housing when the first housing vibrates, so that deterioration of the electric wire can be suppressed.

(Aspect B5)

The power tool as defined in Aspect B4, wherein:

the second housing comprises an inner wall part, a passage that is separated (partitioned, isolated) from the first housing is defined by the inner wall part within the second housing, the at least one electric wire includes a motor wire that is connected to the motor, an electric wire extending from the motor passes through the passage, extends out of the second housing and is connected to the motor wire outside the second housing.

According to Aspect B5, the assembler can easily connect the electric wire extending from the controller and the electric wire extending from the motor, outside the housing. Further, a possibility that a portion of the electric wire from the motor that extends within the second housing touches the first housing when the first housing vibrates can be reduced. Thus, the possibility of deterioration of the electric wire can be reduced.

(Aspect B6)

The power tool as defined in any one of Aspects B1 to B5, further comprising:

at least one handle that has a grip part and that is fixedly coupled to the housing outside the housing, wherein the at least one handle is configured to at least partially cover the at least one electric wire disposed outside the housing.

According to Aspect B6, at least a portion of the electric wire disposed outside the housing can be protected by the at least one handle.

(Aspect B7)

The power tool as defined in Aspect B6, wherein:

the at least one handle includes two handles disposed on opposite sides of the housing in a second direction that is orthogonal to the driving axis, and the grip part of each of the two handles extends along an axis extending in the second direction.

According to Aspect B7, the power tool can be made suitable to be used in a state in which the user holds the grip parts with his/her both hands and directs the tool accessory downward.

(Aspect B8)

The power tool as defined in Aspect B3 or any one of Aspect B4 to B7 depending directly or indirectly from Aspect B3, wherein the at least one battery mount part includes two battery mount parts disposed on opposite sides of the housing in a second direction that is orthogonal to the driving axis.

According to Aspect B8, the weight balance can be optimized in the second direction when the batteries are received by the battery mount parts. Consequently, the user can perform a hammering operation while stably holding the power tool.

(Aspect B9)

The power tool as defined in Aspect B8, wherein:

each of the two battery mount parts has a wall part that extends outward from the housing, the terminal is supported by the wall part, and the at least one terminal wire includes two terminal wires that extend through openings formed at the wall parts and are connected to the terminals of the two battery mount parts, respectively.

According to Aspect B9, the electric wires can be lead to the terminals of the two battery mount parts along efficient routes (paths).

(Aspect B10)

The power tool as defined in any one of Aspects B1 to B9, wherein:

the second housing includes (i) a second housing body, and (ii) a case that is fixedly coupled to the second housing body and that houses the controller, and the case has a function of temporarily fixing the controller.

According to Aspect B10, the assembler can integrally handle the controller with the case in a state in which the controller is temporarily fixed to the case, so that the assembler can easily couple the case to the second housing.

(Aspect B11)

The housing has at least one opening for wiring, and the at least one opening communicatively communicates an inside and an outside of the housing in a state in which the first housing and the second housing are coupled to each other.

(Aspect B12)

The power tool further comprises a motor housed in the first housing, and the at least one opening (or recess) for wiring includes (i) a first opening for the at least one electric wire extending from the controller, and (ii) a second opening for the electric wire extending from the motor.

(Aspect B13)

The power tool further comprises a switch that is configured to activate the motor and that is supported on the housing outside the housing, the at least one electric wire includes a switch wire that is directly connected to the switch, and the at least one handle is coupled to the housing so as to cover the switch wire and the switch.

Correspondences between the features of Aspects B1 to B13 and the features of the present disclosure or the present invention are as follows. However, the features of the embodiment are merely exemplary, and do not limit the features of Aspects B1 to B13.

The hammer 1 is an example of a "power tool having a hammer mechanism". The motor 71 is an example of a "component provided to the first housing". Each of the openings 30L, 30R, 301 is an example of a "recess for wiring". Each of the first elastic member 111 and the second elastic member 112 is an example of an "elastic member". The upper wall part 51 is an example of a "wall part". The opening 513 of the battery housing 5 is an example of an "opening". The top cover 34 is an example of a "second housing body". The controller case 37 is an example of a "case".

The above-described embodiment is merely exemplary, and the power tool having the hammer mechanism according to Aspect B1 to B13 is not limited to the hammer 1 of the above-described embodiment. For example, the following non-limiting modifications may be made. Further, at least one of these modifications may be employed in combination with at least one of the hammer 1 of the above-described embodiment and the claimed features.

The power tool having the hammer mechanism according to Aspects B1 to B13 may be embodied as a rotary hammer (hammer drill) that is capable of rotationally driving the tool accessory around the driving axis, in addition to linearly driving the tool accessory along the driving axis. Depending on the kind of the power tool, the structure and/or the arrangement of the motor and/or the driving mechanism of the tool accessory (e.g., the motion converting mechanism and the striking mechanism) may be appropriately changed to any known structure and arrangement.

The shapes and/or the components of the first housing 2 and the second housing 3 are not limited to those in the above-described embodiment and thus may be appropriately changed. For example, the number and/or the positions of the openings (the openings for wiring) that lead the electric wire 38 extending from the controller 70 and the electric wire 715 extending from the motor 71 to the outside of the second housing 3 may be changed in accordance with the number and/or the positions of electric wires and/or components that are connected to each other. For example, the opening(s) for wiring may be formed by (i) at least one recess (notch) that is formed at the lower edge of the top cover 34 or (ii) at least one through hole disposed on at least one of the main cover 31 and the top cover 34. Further, the structure of the controller case 37 (for example, the shape, number, and/or position of the wire guide(s) 372) may be changed in accordance with the change of the opening(s) for wiring.

The elastic coupling structure between the first housing 2 and the second housing 3 (for example, the kind, number, and/or position of the elastic members interposed between the first housing 2 and the second housing 3) may be appropriately changed. The guide structure of the relative movement between the first housing 2 and the second housing 3 (for example, the structure, number, and/or position of the first guide parts 114 and the second guide parts 117) may be also appropriately changed. The number of each of the elastic members and the guide parts may be preferably two or more. Further, the arrangement of the electric wires according to the present disclosure may be applied to a configuration in which a housing is formed by two housing parts (two separate housing bodies) that are fixedly coupled in a substantially immovable manner relative to each other.

The two handles 4 may be coupled to the main cover 31 and the top cover 34 such that each of the handles 4 extends across the main cover 31 and the top cover 34. Alternatively, the handles 4 may be coupled to the top cover 34 (i.e., a portion of the second housing 3 that houses the controller 70). The number of the handles 4 may be one.

The number of the battery mount parts 6 (i.e., the number of the batteries 59 to be mounted to the hammer 1) may be one or three or more. Further, the position of the battery mount part 6 may be appropriately changed. The hammer 1 may include a power cord instead of the battery mount part 6, so that the hammer 1 is connectable to an external power source via the power cord.

DESCRIPTION OF THE REFERENCE NUMERALS

1: hammer, 11: housing, 111: first elastic member, 112: second elastic member, 114: first guide part, 115: guide tube, 116: guide groove, 117: second guide part, 118: guide protrusion, 119: guide rib, 15: tool holder, 2: first housing, 21: upper housing part, 212: spring receiver, 213: spring receiver, 26: lower housing part, 261: cylinder, 3: second housing, 30L: opening, 30R: opening, 301: opening, 31: main cover, 311: side wall part, 321: spring receiver, 313: front wall part, 315: rear wall part, 317: inner wall part, 318: passage, 34: top cover, 341: upper wall part, 343: peripheral wall part, 37: controller case, 370: bottom wall part, 371: recess, 372: wire guide, 373: passage, 374: spring receiver, 375: recess, 376: recess, 379: engagement piece, 38: electric wire, 38L: electric wire group, 38R: electric wire group, 381: terminal wire, 382: LED wire, 383: motor wire, 384: connector, 385: switch wire, 4: handle, 4L: left handle, 4R: right handle, 41: base part, 42: grip part, 43: trigger, 5: battery housing, 501: base part, 502: cover part, 51: upper wall part, 511: first upper wall, 512: second upper wall, 513: opening, 52: lower wall part, 53: rear wall part, 54: side wall part, 59: battery, 6: battery mount part, 61: engagement part, 65: terminal part, 651: terminal, 655: base, 70: controller, 700: controller assembly, 705: heat sink, 71: motor, 711: output shaft, 715: electric wire, 716: connector, 72: switch, 73: motion converting mechanism, 731: crank shaft, 733: connection rod, 735: piston, 75: striking mechanism, 750: air chamber, 751: striker, 753: impact bolt, 77: main power switch, 78: wireless unit, 781: activation button, 79: LED light, A1: driving axis, A2 axis

What is claimed is:

1. A power tool having a hammer mechanism that is configured to linearly drive a tool accessory along a driving axis by striking the tool accessory, the power tool comprising:

a first housing that defines the driving axis;

a motor that is housed in the first housing;

a second housing that at least partially overlaps the first housing in a first direction that is parallel to the driving axis and that is coupled to the first housing via at least one elastic member to be movable relative to the first housing in the first direction that is parallel to the driving axis; and a controller that is housed in the second housing and that is configured to control driving of the motor, wherein:

the second housing has at least one opening for wiring, the at least one opening communicatively connecting an inside and an outside of the second housing, at least one electric wire extends from the controller to the outside of the second housing through the at least one opening, the second housing includes (i) a second housing body that has the at least one opening, and (ii) a case that is fixedly coupled to the second housing body and that houses the controller, and the case includes (i) a partition wall part that is spaced apart from the first housing and that is between the controller and the first housing, and (ii) at least one guide that is configured to guide the at least one electric wire extending from the controller toward an outside of the case and toward the at least one opening, and a distal end of the at least one guide is located at substantially the same position as an outer surface of the first housing in a second direction that is orthogonal to the driving axis, or located between the outer surface of the first housing and an inner surface of the second housing in the second direction.

2. A power tool having a hammer mechanism that is configured to linearly drive a tool accessory along a driving axis by striking the tool accessory, the power tool comprising:

a first housing that defines the driving axis;

a motor that is housed in the first housing;

a second housing that at least partially overlaps the first housing in a first direction that is parallel to the driving axis and that is coupled to the first housing via at least one elastic member to be movable relative to the first housing in the first direction that is parallel to the driving axis; and a controller that is housed in the second housing and that is configured to control driving of the motor, wherein:

the second housing has at least one opening for wiring, the at least one opening communicatively connecting an inside and an outside of the second housing, at least one electric wire extends from the controller to the outside of the second housing through the at least one opening, the second housing includes (i) a first portion that houses the controller, and (ii) a second portion that is coupled to the first portion, and the at least one opening is at least one recess formed at a connecting edge of the first portion that is connected to the second portion or at a connecting edge of the second portion that is connected to the first portion.

3. A power tool having a hammer mechanism that is configured to linearly drive a tool accessory along a driving axis by striking the tool accessory, the power tool comprising:

a first housing that defines the driving axis;

a motor that is housed in the first housing;

a second housing that at least partially overlaps the first housing in a first direction that is parallel to the driving axis and that is coupled to the first housing via at least one elastic member to be movable relative to the first housing in the first direction that is parallel to the driving axis;

a controller that is housed in the second housing and that is configured to control driving of the motor; and at least one handle that includes a grip part and that is fixedly coupled to the second housing outside the second housing, wherein:

the second housing has at least one opening for wiring, the at least one opening communicatively connecting an inside and an outside of the second housing, at least one electric wire extends from the controller to the outside of the second housing through the at least one opening, the power tool further includes at least one battery mount part that is disposed outside the second housing and that is configured to removably receive a battery, the at least one battery mount part has a terminal that is configured to electrically connect to a terminal of the battery when the battery is received by the at least one battery mount part, the at least one electric wire includes at least one terminal wire that is connected to the terminal of the at least one battery mount part, the at least one handle is configured to at least partially cover the at least one electric wire outside the second housing, the at least one handle is between the controller and the at least one battery mount part in the first direction, the at least one battery mount part has a wall part that is adjacent to the at least one handle and that extends outward of the second housing, the terminal of the at least one battery mount part is supported by the wall part, and the terminal wire passes through an opening formed at the wall part and is connected to the terminal of the battery mount part.

4. A power tool having a hammer mechanism that is configured to linearly drive a tool accessory along a driving axis by striking the tool accessory, the power tool comprising:

a first housing that defines the driving axis;

a motor that is housed in the first housing;

a second housing that at least partially overlaps the first housing in a first direction that is parallel to the driving axis and that is coupled to the first housing via at least one elastic member to be movable relative to the first housing in the first direction that is parallel to the driving axis;

a controller that is housed in the second housing and that is configured to control driving of the motor; and at least one handle that includes a grip part and that is fixedly coupled to the second housing outside the second housing, wherein:

the second housing has at least one opening for wiring, the at least one opening communicatively connecting an inside and an outside of the second housing, at least one electric wire extends from the controller to the outside of the second housing through the at least one opening, the at least one handle is configured to at least partially cover the at least one electric wire outside the second housing, the at least one handle includes two handles that are on opposite sides of the second housing in a second direction that is orthogonal to the driving axis, each of the grip parts of the two handles extends along an axis extending in the second direction, the power tool further includes two battery mount parts that are adjacent to the two handles, respectively, on opposite sides of the second housing in the second direction, each of the two battery mount parts is configured to removably receive a battery and has a terminal that is configured to electrically connect to a terminal of the battery when the battery is received by the battery mount part, the at least one opening includes two openings formed at opposite side portions of the second housing in the second direction, and at least one terminal wire includes two terminal wires that extend to the outside of the second housing through the two openings and that are connected to the terminals of the two battery mount parts, respectively.

5. The power tool as defined in claim 4, further comprising:

a switch that is configured to activate the motor and that is housed in the at least one handle, wherein the at least one electric wire includes a switch wire that is connected to the switch.

6. The power tool as defined in claim 4, wherein:

the second housing includes (i) a second housing body that has the two openings, and (ii) a case that is fixedly coupled to the second housing body and that houses the controller, and the case includes (i) a partition wall part that is spaced apart from the first housing and that is between the controller and the first housing, and (ii) two guides that are configured to guide the two terminal wires toward the two openings.

7. The power tool as defined in claim 6, wherein:

the second housing body includes (i) a top cover to which the case is coupled, and (ii) a main cover that is coupled to the top cover, and the two openings are two recesses, each of which being formed at a connecting edge of the top cover that is connected to the main cover or at a connecting edge of the main cover that is connected to the top cover.

8. A power tool having a hammer mechanism that is configured to linearly drive a tool accessory along a driving axis by striking the tool accessory, the power tool comprising:

a first housing that defines the driving axis;

a motor that is housed in the first housing;

a second housing that at least partially overlaps the first housing in a first direction that is parallel to the driving axis and that is coupled to the first housing via at least one elastic member to be movable relative to the first housing in the first direction that is parallel to the driving axis;

a controller that is housed in the second housing and that is configured to control driving of the motor; and at least one handle that includes a grip part and that is fixedly coupled to the second housing outside the second housing, wherein:

the second housing has at least one opening for wiring, the at least one opening communicatively connecting an inside and an outside of the second housing, at least one electric wire extends from the controller to the outside of the second housing through the at least one opening, the at least one handle is configured to at least partially cover the at least one electric wire outside the second housing, the at least one handle includes two handles that are on opposite sides of the second housing in a second direction that is orthogonal to the driving axis, each of the grip parts of the two handles extends along an axis extending in the second direction, the power tool further includes a switch that is configured to activate the motor and that is housed in a first one of the two handles, and the at least one electric wire extending from the controller includes (i) a switch wire that is connected to the switch, and (ii) a motor wire that is connected to an electric wire extending from the motor, outside the second housing and inside a second one of the two handles.

9. The power tool as defined in claim 8, further comprising:

a switch that is configured to activate the motor and that is housed in the at least one handle, wherein the at least one electric wire includes a switch wire that is connected to the switch.

10. The power tool as defined in claim 8, wherein the at least one opening includes (i) at least one first opening for the at least one electric wire extending from the controller, and (ii) a second opening for the electric wire extending from the motor.

11. The power tool as defined in claim 10, wherein:

the second housing has an inner wall part, a passage that is separated from the first housing by the inner wall part is defined within the second housing, and the electric wire extending from the motor passes through the passage and extends out of the second housing through the second opening.

* * * * *